United States Patent
Fu et al.

(10) Patent No.: US 11,909,529 B2
(45) Date of Patent: Feb. 20, 2024

(54) METHOD, APPARATUS FOR TRANSMITTING HARQACK INFORMATION, ELECTRONIC DEVICE AND STORAGE MEDIUM

(71) Applicant: Samsung Electronics Co., Ltd., Suwon-si (KR)

(72) Inventors: Jingxing Fu, Beijing (CN); Yi Wang, Beijing (CN); Bin Yu, Beijing (CN); Chen Qian, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 17/309,296

(22) PCT Filed: Jan. 9, 2020

(86) PCT No.: PCT/KR2020/000387
§ 371 (c)(1),
(2) Date: May 17, 2021

(87) PCT Pub. No.: WO2020/145681
PCT Pub. Date: Jul. 16, 2020

(65) Prior Publication Data
US 2022/0029748 A1      Jan. 27, 2022

(30) Foreign Application Priority Data

Jan. 10, 2019 (CN) .......................... 201910023777.2
Jan. 10, 2019 (CN) .......................... 201910023780.4

(51) Int. Cl.
*H04L 1/18* (2023.01)
*H04L 1/1812* (2023.01)
*H04L 1/1867* (2023.01)

(52) U.S. Cl.
CPC .......... *H04L 1/1812* (2013.01); *H04L 1/1887* (2013.01); *H04L 1/1896* (2013.01)

(58) Field of Classification Search
None
See application file for complete search history.

(56) References Cited

U.S. PATENT DOCUMENTS 11,316,647 B2 *   4/2022   Zhang .................... H04L 1/1854
11,690,050 B2 *   6/2023   Gao ....................... H04W 72/04
                                                                    370/329

(Continued)

FOREIGN PATENT DOCUMENTS

WO      2018084588 A1     5/2018
WO      2020/027143 A1    2/2020

OTHER PUBLICATIONS

European Patent Office, "Supplementary Partial European Search Report" dated Dec. 6, 2021, in connection with European Patent Application No. 20739170.7, 18 pages.

(Continued)

*Primary Examiner* — Eunsook Choi

(57) ABSTRACT

The application provides a method, apparatus for transmitting HARQ-ACK information, electronic device and storage medium. The method includes: determining, by a terminal, a TU in which a PUCCH transmitting the HARQ-ACK is located according to a length of the time slot in which the PUCCH transmitting the HARQ-ACK is located and the number of PUCCHs in the time slot; transmitting, by the terminal, the HARQ-ACK information based on the determined TU in which the PUCCH transmitting the HARQ-ACK is located and a corresponding HARQ timing relationship.

15 Claims, 21 Drawing Sheets

(56) References Cited

U.S. PATENT DOCUMENTS

| | | | |
|---|---|---|---|
| 11,722,260 B2* | 8/2023 | Baldemair | H04L 1/1896 |
| | | | 370/329 |
| 11,778,596 B2* | 10/2023 | Zhao | H04L 5/0042 |
| | | | 370/330 |
| 2015/0016386 A1 | 1/2015 | Tamrakar et al. | |
| 2017/0041923 A1 | 2/2017 | Park | |
| 2019/0268089 A1 | 8/2019 | Fu et al. | |
| 2019/0313386 A1* | 10/2019 | Hwang | H04W 72/0446 |
| 2019/0363842 A1* | 11/2019 | Fu | H04L 1/1671 |
| 2021/0306107 A1 | 9/2021 | Yin et al. | |

OTHER PUBLICATIONS

ZTE et al., "URLLC PHY enhancements", 3GPP TSG RAN WG1 Meeting #94, Gothenburg, Sweden, Aug. 20-24, 2018, R1-1808211, 10 pages.

International Search Report and Written Opinion of the International Searching Authority in connection with International Application No. PCT/KR2020/000387 dated Apr. 17, 2020, 13 pages.

CATT, "Discussion on HARQ management and HARQ-ACK feedback," R1-1717834, 3GPP TSG RAN WG1 Meeting #90bis, Prague, CZ, Oct. 9-13, 2017, 7 pages.

OPPO, "UCI enhancement for URLLC," R1-1812816, 3GPP TSG RAN WG1 Meeting #95, Spokane, USA, Nov. 12-16, 2018, 6 pages.

ZTE, "UL control enhancements for URLLC," R1-1812385, 3GPP TSG RAN WG1 Meeting #95, Spokane, USA, Nov. 12-16, 2018, 7 pages.

\* cited by examiner

METHOD, APPARATUS FOR TRANSMITTING HARQACK INFORMATION, ELECTRONIC DEVICE AND STORAGE MEDIUM

CROSS-REFERENCE TO RELATED APPLICATION

This application is a 371 of International Application No. PCT/KR2020/000387, filed Jan. 9, 2020, which claims priority to Chinese Patent Application No. 201910023777.2, filed Jan. 10, 2019, and Chinese Patent Application No. 201910023780.4, filed Jan. 10, 2019, the disclosures of which are herein incorporated by reference in their entirety.

BACKGROUND

1. Field

The present application relates to the field of wireless communication technologies, and in particular, to a method, apparatus for transmitting HARQ-ACK information, electronic device, and storage medium. The present disclosure relates to the field of wireless communication technologies, and particularly relates to a method for reporting channel state information, a terminal equipment, an electronic equipment, and a base station.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

In a new radio (NR) transmission system, the transmission resources have the following changes: the resources for transmitting the DCI no longer occupy the entire system bandwidth. For the normal CP, the time domain length of the resource blocks of the PDSCH transmission is no longer necessarily 14 OFDM symbols. It no longer mainly uses the CRS for demodulating the PDSCH, but mainly uses a user-specific demodulation reference signal (DMRS) to perform demodulation. After the foregoing change occurs, if the CSI is still computed according to the existing method, the resources occupied by the PDSCH assumed to compute the CSI are inconsistent with the resources for actual PDSCH transmission. Therefore, the computation of the CSI is not accurate, thereby affecting the transmission performance of the PDSCH and possibly wasting resources.

To overcome or at least partially solve the above technical problem, the following technical solutions are particularly provided.

In a first aspect, the present application provides a method for transmitting HARQ-ACK information, comprising:
  determining, by a terminal, a time unit (TU) in which a PUCCH transmitting the HARQ-ACK is located according to a length of the time slot in which the PUCCH transmitting the HARQ-ACK is located and the number of PUCCHs in the time slot;
  transmitting, by the terminal, the HARQ-ACK information based on the determined TU in which the PUCCH transmitting the HARQ-ACK is located and a corresponding HARQ timing relationship.

In an alternative implementation, determining, by a terminal, a TU in which a PUCCH transmitting the HARQ-ACK is located according to a length of the time slot in which the PUCCH transmitting the HARQ-ACK is located and the number of PUCCHs in the time slot, including any of the following conditions:
  if only one PUCCH is used for transmitting the HARQ-ACK in a time slot, a length of time slot is determined as a TU in which the PUCCH transmitting the HARQ-ACK is located;
  if more than one PUCCHs are used for transmitting the HARQ-ACK in a time slot, a part of a time slot is determined as a TU in which the PUCCH transmitting the HARQ-ACK is located;

if more than one PUCCHs are used for transmitting the HARQ-ACK in a time slot, a length of time slot is determined as a TU in which the PUCCH transmitting the HARQ-ACK is located, and an indication information is received, wherein the indication information is used to indicate to transmit the HARQ-ACK on a specific PUCCH in a time slot in which the HARQ-ACK is transmitted, determined according to a length of time slot in TU.

In an alternative implementation, the transmitting, by the terminal, the HARQ-ACK information according to the determined TU in which the PUCCH transmitting the HARQ-ACK is located and a corresponding HARQ timing relationship, including:

determining a reference point where a PDSCH-to-HARQ-feedback timing value is equal to 0 according to an overlapping between the TU in which the PDSCH is located and the TU in which the PUCCH transmitting the HARQ-ACK is located or according to an overlapping between an OFDM symbol in the time slot in which the PDSCH is actually transmitted and the TU in which the PUCCH transmitting the HARQ-ACK is located;

transmitting the HARQ-ACK information according to the reference point and the corresponding HARQ-ACK timing relationship.

In an alternative implementation, the determining a reference point where a PDSCH-to-HARQ-feedback timing value is equal to 0 according to an overlapping between the TU in which the PDSCH is located and the TU in which the PUCCH transmitting the HARQ-ACK is located, including any of the following conditions:

if the TU in which the PDSCH is located is less than or equal to the TU in which the PUCCH transmitting the HARQ-ACK is located and more than one TU in which the PDSCH is transmitted completely overlaps with one TU in which the PUCCH transmitting the HARQ-ACK is located, determining the TU in which the PUCCH transmitting the HARQ-ACK is located as the reference point where the PDSCH-to-HARQ-feedback timing value is equal to 0;

if the TU in which the PDSCH is transmitted is greater than the TU in which the PUCCH transmitting the HARQ-ACK is located, and more than one TU in which the PUCCH transmitting the HARQ-ACK is located completely overlaps with one TU in which the PDSCH is transmitted, determining one of the more than one TU in which the PUCCH transmitting the HARQ-ACK is located as the reference point where the PDSCH-to-HARQ-feedback timing value is equal to 0;

if the TU in which the PDSCH is transmitted dose not completely overlap with the TU in which the PUCCH transmitting the HARQ-ACK is located, determining one of the more than one TU in which the PUCCH transmitting the HARQ-ACK is located which is overlapped with any TU in which the PDSCH is transmitted as the reference point where the PDSCH-to-HARQ-feedback timing value is equal to 0.

In an alternative implementation, the determining one of more than one TU in which the PUCCH transmitting the HARQ-ACK is located as the reference point where the PDSCH-to-HARQ-feedback timing value is equal to 0, including any one of the followings:

predefining one TU as the reference point where the PDSCH-to-HARQ-feedback timing value is equal to 0;

selecting one TU as the reference point where the PDSCH-to-HARQ-feedback timing value is equal to 0 according to a service requirement.

In an alternative implementation, the selecting one TU as the reference point where the PDSCH-to-HARQ-feedback timing value is equal to 0 according to a service requirement, including any of the following conditions:

if the service is Enhanced mobile broadband (eMBB) service, selecting the last TU of the overlapped TUs in which the HARQ-ACK is transmitted as the reference point where the PDSCH-to-HARQ-feedback timing value is equal to 0;

if the service is Low-latency high-reliability (URLLC) service, selecting one of the overlapped TUs in which the HARQ-ACK is transmitted except the last TU as the reference point where the PDSCH-to-HARQ-feedback timing value is equal to 0;

if the service is URLLC service, selecting the last TU of the overlapped TUs in which the HARQ-ACK is transmitted as the reference point where the PDSCH-to-HARQ-feedback timing value is equal to 0, and determining the value of the HARQ-ACK timing relationship is an arbitrary integer.

In an alternative implementation, before the selecting one TU as the reference point where the PDSCH-to-HARQ-feedback timing value is equal to 0 according to a service requirement, further includes:

determining the service requirement by at least one of the followings:

a scrambled Radio Network Temporary Identifier (RNTI) of the PDCCH scheduling the PDSCH;

Downlink control information (DCI) of the PDCCH.

In an alternative implementation, the determining the reference point where the PDSCH-to-HARQ-feedback timing value is equal to 0 according to an overlapping between an OFDM symbol in the time slot in which the PDSCH is actually transmitted and the TU in which the PUCCH transmitting the HARQ-ACK is located, including any one of the following conditions:

if the last OFDM symbol in which the PDSCH is actually transmitted only overlaps with one TU in which the PUCCH transmitting the HARQ-ACK is located, determining the one TU in which the PUCCH transmitting the HARQ-ACK is located as the reference point where the PDSCH-to-HARQ-feedback timing value is equal to 0;

if the last OFDM symbol in which the PDSCH is actually transmitted overlaps with more than one TU in which the PUCCH transmitting the HARQ-ACK is located, determining the last TU in which the PUCCH transmitting the HARQ-ACK is located as the reference point where the PDSCH-to-HARQ-feedback timing value is equal to 0.

In an alternative implementation, if a PUCCH transmitting Channel state information (CSI) overlaps with at least two PUCCHs transmitting the HARQ-ACK in one time slot, multiplexing the CSI and HARQ-ACK by at one of the following manners:

the CSI is multiplexed in the last PUCCH transmitting the HARQ-ACK;

the CSI is multiplexed in the first PUCCH transmitting the HARQ-ACK that satisfies a delay requirement.

In an alternative implementation, the value of the HARQ timing relationship is indicated by a field in a PDCCH scheduling a PDSCH.

In an alternative implementation, when the number of bits of HARQ-ACK is determined semi-statically by the high layer signaling configuration, the PDCCH scheduling PDSCH further includes an HARQ-ACK bit number indication information field, the HARQ-ACK bit number indication information field is used to indicate the number of bits of the HARQ-ACK.

In an alternative implementation, the number of bits indicating the HARQ-ACK is the number of bits of HARQ-ACK generated by one PDSCH; or the number of bits indicating the HARQ-ACK is the number of bits of HARQ-ACK determined according to a set of downlink time slots in which the HARQ-ACK is fed back in any of uplink subframes.

In a second aspect, the present application provides an apparatus for transmitting HARQ-ACK information, comprising:

a determining module, configured to determine a TU in which a PUCCH transmitting the HARQ-ACK is located according to a length of the time slot in which the PUCCH transmitting the HARQ-ACK is located and the number of PUCCHs in the time slot;

a transmitting module, configured to transmit the HARQ-ACK information based on the determined TU in which the PUCCH transmitting the HARQ-ACK is located and the corresponding HARQ timing relationship.

In an alternative implementation, the determining module, specifically configured to be used for any one of the following conditions:

if only one PUCCH is used for transmitting the HARQ-ACK in a time slot, a length of time slot is determined as a TU in which the PUCCH transmitting the HARQ-ACK is located;

if more than one PUCCHs are used for transmitting the HARQ-ACK in a time slot, a part of a time slot is determined as a TU in which the PUCCH transmitting the HARQ-ACK is located;

if more than one PUCCHs are used for transmitting the HARQ-ACK in a time slot, a time slot length is determined as a TU in which the PUCCH transmitting the HARQ-ACK is located, and an indication information is received, wherein the indication information is used to indicate to transmit the HARQ-ACK on a specific PUCCH in a time slot in which the HARQ-ACK is transmitted, determined according to a length of time slot in TU.

In an alternative implementation, the transmitting module is specifically configured to:

determine a reference point where a PDSCH-to-HARQ-feedback timing value is equal to 0 according to an overlapping between the TU in which the PDSCH is located and the TU in which the PUCCH transmitting the HARQ-ACK is located or according to an overlapping between an OFDM symbol in the time slot in which the PDSCH is actually transmitted and the TU in which the PUCCH transmitting the HARQ-ACK is located;

transmit the HARQ-ACK information according to the reference point and the corresponding HARQ-ACK timing relationship.

In an alternative implementation, the transmitting module is specifically configured to be used for any of the following conditions:

if the TU in which the PDSCH is located is less than or equal to the TU in which the PUCCH transmitting the HARQ-ACK is located and more than one TU in which the PDSCH is transmitted completely overlaps with one TU in which the PUCCH transmitting the HARQ-ACK is located, determining the TU in which the PUCCH transmitting the HARQ-ACK is located as the reference point where the PDSCH-to-HARQ-feedback timing value is equal to 0;

if the TU in which the PDSCH is transmitted is greater than the TU in which the PUCCH transmitting the HARQ-ACK is located, and more than one TU in which the PUCCH transmitting the HARQ-ACK is located completely overlaps with one TU in which the PDSCH is transmitted, determining one of the more than one TU in which the PUCCH transmitting the HARQ-ACK is located as the reference point where the PDSCH-to-HARQ-feedback timing value is equal to 0;

if the TU in which the PDSCH is transmitted dose not completely overlap with the TU in which the PUCCH transmitting the HARQ-ACK is located, determining one of the more than one TU in which the PUCCH transmitting the HARQ-ACK is located which is overlapped with any TU in which the PDSCH is transmitted as the reference point where the PDSCH-to-HARQ-feedback timing value is equal to 0.

In an alternative implementation, the transmitting module is specifically configured to be used for any one of the followings:

predefining one TU as the reference point where the PDSCH-to-HARQ-feedback timing value is equal to 0;

selecting one TU as the reference point where the PDSCH-to-HARQ-feedback timing value is equal to 0 according to a service requirement.

In an alternative implementation, the transmitting module is specifically configured to be used for any of the following conditions:

if the service is eMBB service, selecting the last TU of the overlapped TUs in which the HARQ-ACK is transmitted as the reference point where the PDSCH-to-HARQ-feedback timing value is equal to 0;

if the service is URLLC service, selecting one of the overlapped TUs in which the HARQ-ACK is transmitted except the last TU as the reference point where the PDSCH-to-HARQ-feedback timing value is equal to 0;

if the service is URLLC service, selecting the last TU of the overlapped TUs in which the HARQ-ACK is transmitted as the reference point where the PDSCH-to-HARQ-feedback timing value is equal to 0, and determining the value of the HARQ-ACK timing relationship is an arbitrary integer.

In an alternative implementation, the transmitting module is also configured to determine the service requirement by at least one of the followings:

a scrambled RNTI of the PDCCH scheduling the PDSCH; DCI of the PDCCH.

In an alternative implementation, the transmitting module is specifically configured to be used for any one of the following conditions:

if the last OFDM symbol in which the PDSCH is actually transmitted only overlaps with one TU in which the PUCCH transmitting the HARQ-ACK is located, determining the one TU in which the PUCCH transmitting the HARQ-ACK is located as the reference point where the PDSCH-to-HARQ-feedback timing value is equal to 0;

if the last OFDM symbol in which the PDSCH is actually transmitted overlaps with more than one TU in which the PUCCH transmitting the HARQ-ACK is located, determining the last TU in which the PUCCH transmitting the HARQ-ACK is located as the reference point where the PDSCH-to-HARQ-feedback timing value is equal to 0.

In an alternative implementation, the transmitting module is specifically configured to multiplex the CSI and HARQ-ACK if a PUCCH transmitting Channel state information (CSI) overlaps with at least two PUCCHs transmitting the HARQ-ACK in one time slot by at one of the following manners:

the CSI is multiplexed in the last PUCCH transmitting the HARQ-ACK;

the CSI is multiplexed in the first PUCCH transmitting the HARQ-ACK that satisfies a delay requirement.

In an alternative implementation, the value of the HARQ timing relationship is indicated by a field in a PDCCH scheduling a PDSCH.

In an alternative implementation, when the number of bits of HARQ-ACK is determined semi-statically by the high layer signaling configuration, the PDCCH scheduling PDSCH further includes an HARQ-ACK bit number indication information field, the HARQ-ACK bit number indication information field is used to indicate the number of bits of the HARQ-ACK.

In an alternative implementation, the number of bits indicating the HARQ-ACK is the number of bits of HARQ-ACK generated by one PDSCH; or the number of bits indicating the HARQ-ACK is the number of bits of HARQ-ACK determined according to a set of downlink time slots in which the HARQ-ACK is fed back in any of uplink subframes.

In a third aspect, the present application provides an electronic device, the electronic device comprising: a processor and a memory, the memory stores at least one instruction, at least one program, a code set or an instruction set, the at least one instruction, the at least one program, the code set or the instruction set being loaded and executed by the processor to implement the method according to the first aspect of the present disclosure.

In a fourth aspect, the present application provides a computer readable storage medium, the computer storage medium is for storing computer instructions, programs, a code set or an instruction set which, when operated on a computer, cause the computer to perform the method according to the first aspect of the disclosure.

As can be seen from the above technical solutions, in the method for transmitting the HARQ-ACK information provided by the present application, a suitable HARQ-ACK information transmission format can be selected for different lengths of time slot, the data transmission of different delay requirements is satisfied, and the transmission effect of the HARQ-ACK information is improved.

The purpose of the present disclosure is to solve at least one of the above technical defects. The technical solution provided by the present disclosure is as follows.

According to a fifth aspect of the disclosure, a method for reporting channel state information is provided, and the method comprises:

receiving information of a base station; determining the number of resources for a physical downlink shared channel (PDSCH) transmission required for determining channel state information (CSI) according to the received information, or determining the number of resources for the PDSCH transmission based on a subcarrier spacing of a current orthogonal frequency division multiplexing (OFDM) symbol;

determining the CSI based on the number of resources for the PDSCH transmission, and transmitting the determined CSI to the base station.

According to a sixth aspect of the disclosure, a method for reporting channel state information is provided, and the method comprises: transmitting information to a terminal equipment;

receiving channel state information (CSI) transmitted by the terminal equipment, wherein the CSI is determined by the terminal equipment based on the number of resources for PDSCH transmission that is determined based on the information; or receiving the CSI transmitted by the terminal equipment, wherein the CSI is determined based on the number of resources for the PDSCH transmission that is determined based on a subcarrier spacing of a current orthogonal frequency division multiplexing (OFDM) symbol.

According to a seventh aspect of the disclosure, a terminal equipment is provided, and the terminal equipment comprises:

a resource number determining module configured to receive information of a base station, and determine the number of resources for a physical downlink shared channel (PDSCH) transmission required for determining channel state information (CSI) according to the received information; or determine the number of resources for the PDSCH transmission based on a subcarrier spacing of a current orthogonal frequency division multiplexing (OFDM) symbol; and a CSI report module configured to determine the CSI based on the number of resources for the PDSCH transmission, and transmit the determined CSI to the base station.

According to a eighth aspect of the disclosure, a base station is provided, and the base station comprises:

a channel state information (CSI) receiving module configured to transmit information to a terminal equipment and receive a CSI transmitted by the terminal equipment, wherein the CSI is determined by the terminal equipment based on the number of resources for a PDSCH transmission that is determined based on the information; or receiving the CSI transmitted by the terminal equipment, wherein the CSI is determined based on the number of resources for the PDSCH transmission that is determined based on a subcarrier spacing of a current orthogonal frequency division multiplexing (OFDM) symbol.

According to a ninth aspect of the disclosure, an electronic equipment is provided, and the electronic equipment comprises: a memory configured to store computer instructions; and a processor configured to execute the computer instructions to perform the method of the first aspect or the second aspect of the present disclosure.

According to a tenth aspect of the disclosure, a computer-readable storage medium is provided, and the computer-readable storage medium stores a computer program that, when executed by a processor, implements the method of the first aspect or the second aspect of the present disclosure.

The technical solution provided by the embodiment of the present disclosure has the following beneficial effects: in the solution provided by the embodiment of the present disclosure, when determining the CSI, the number of resources for the PDSCH transmission is firstly determined, and then the CSI based on the determined the number of resources for the PDSCH transmission is determined; and based on the solution, the CSI can be determined more accurately, so that the transmission performance of the PDSCH can be better ensured. The solution of the embodiment of the present disclosure can effectively solve the following technical problems: the computed CSI is inaccurate according to an existing method due to the change of the transmission resource in the new radio (NR) transmission system, which affects the transmission performance of the PDSCH, and may cause a problem of waste of transmission resources.

With the solution provided by the embodiment of the present disclosure, the CSI can be determined more accurately, so that the transmission performance of the PDSCH can be better ensured.

BRIEF DESCRIPTION OF THE DRAWINGS

In order to more clearly illustrate the technical solutions in the embodiments of the present application, a brief description of the drawings used in the description of the embodiments of the present application will be briefly described below.

DETAILED DESCRIPTION

Figure 1:
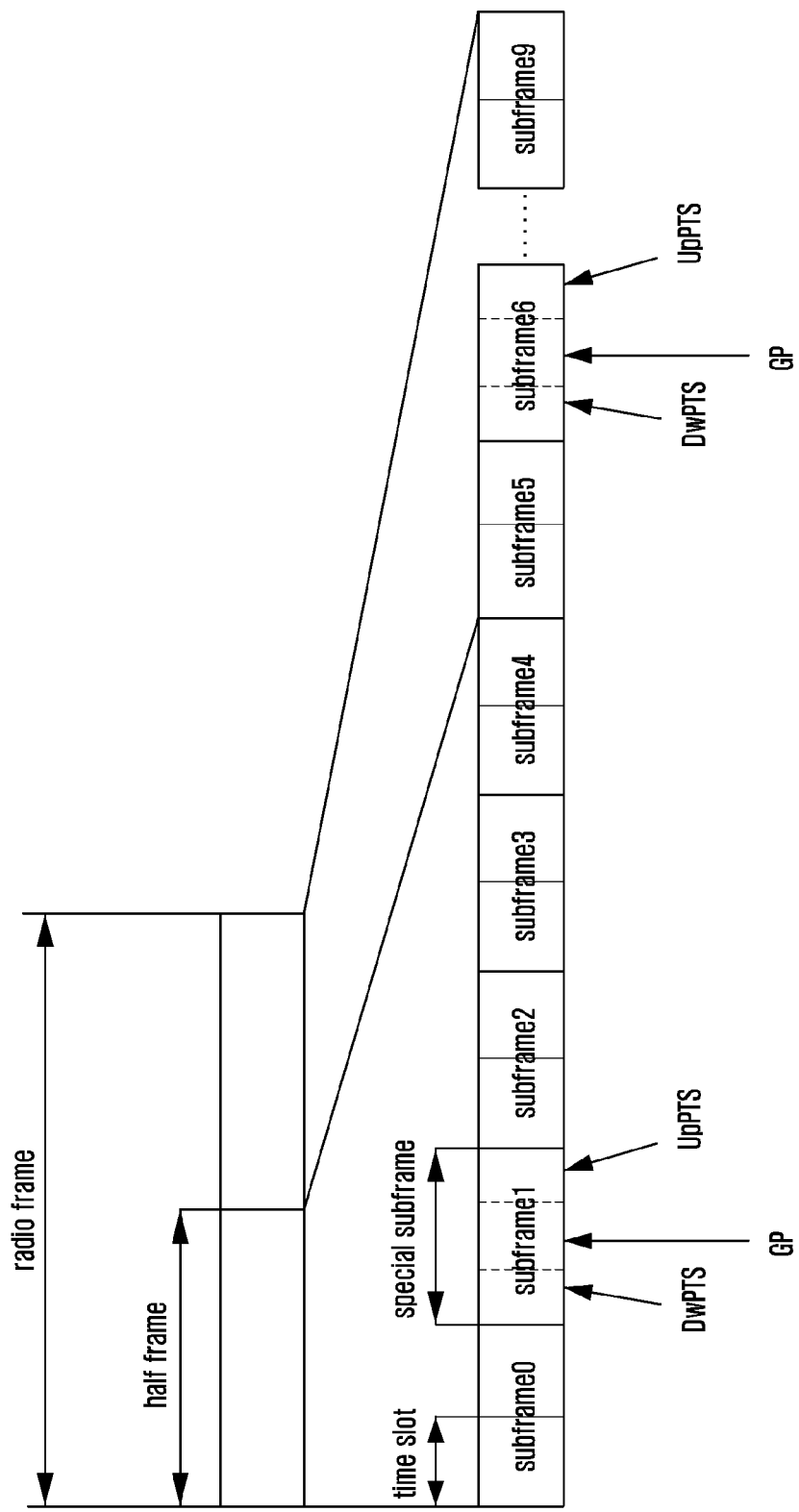
FIG. 1 is a schematic diagram of a frame structure of an LTE TDD system according to an embodiment of the present disclosure.

The embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by one person of ordinary skill in the art that singular forms "a", "an", "the" and "said" may be intended to include plural forms as well, unless otherwise stated. It should be further understood that terms "comprise/comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or wireless coupling. As used herein, the term "and/or" comprises all or any of one or more associated listed items or combinations thereof.

Long Term Evolution (LTE) technology supports two duplex modes: Frequency Division Duplex (FDD) and Time Division Duplex (TDD). FIG. 1 is a schematic diagram of a frame structure of a TDD system of LTE. Each radio frame has a length of 10 milliseconds (ms) and is equally divided into two half-length frames of 5 ms. Each half-length frame contains eight time slots of length of 0.5 ms and three special domains that are combined for 1 ms. The two consecutive time slots constitute one subframe, and the three special domains constitute a special subframe. The three special domains are the Downlink pilot time slot (DwPTS), the Guard period (GP) and Uplink pilot time slot (UpPTS), respectively.

The transmission in the TDD system includes: transmission (referred to as downlink) from the base station to the user equipment (UE) and transmission (referred to as uplink) from the UE to the base station. Based on the frame structure shown in FIG. 1, 10 subframes are shared between the uplink and the downlink every 10 ms, and each subframe is configured for uplink or configured for downlink, and the subframe configured for the uplink is referred to as an uplink subframe, and the subframe configured for the downlink is referred to as a downlink subframe. The TDD system supports seven uplink/downlink configurations. As shown in Table 1, "D" represents a downlink subframe, "U" represents an uplink subframe, and "S" represents the above-mentioned special subframe containing three special domains.

TABLE 1

TDD uplink/downlink configuration

| Configuration sequence number | Conversion point cycle | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The subcarrier space of the Orthogonal Frequency Division Multiplexing (OFDM) symbol may be 15 kHz, 30 kHz, 60 kHz, 120 kHz, etc., and when the subcarrier spaces are different, the lengths of the time slots are also different, the correspondence between the subcarrier space configuration and the length of time slot is shown in Table 2.

TABLE 2

Correspondence between the subcarrier space configuration μ and the length of time slot

| μ | Length of Time slot (ms) | Number of OFDM symbols in each time slot |
|---|---|---|
| 0 | 1 | 14 |
| 1 | 0.5 | 14 |
| 2 | 0.25 | 14 |
| 3 | 0.125 | 14 |
| 4 | 0.0675 | 14 |

The Hybrid Automatic Retransmission Request Acknowledgement (HARQ-ACK) information of the Physical Downlink Shared Channel (PDSCH) may be transmitted in the Physical Uplink Shared Channel (PUSCH) or Physical Uplink Control Channel (PUCCH). In the PUCCH subframe, one PUCCH resource is allocated to feed back the HARQ-ACK feedback information for each PDSCH in each downlink subframe.

For the timing relationship of the PDSCH to the PUCCH, it is assumed that the UE feeds back the HARQ-ACK feedback information in the PUCCH of the uplink subframe n, and the PUCCH indicates the PDSCH in the downlink subframe n-k or the HARQ-ACK feedback information generated by the PDCCH/Enhanced PDCCH (ePDCCH) released by the Semi Persistent Scheduling (SPS), and the timing relationship k between the PDSCH and the PUCCH transmitting the HARQ-ACK generated by the PDSCH is referred to as an HARQ timing relationship.

As described above, the length of the time slot is different due to the different subcarrier spaces. If the HARQ timing information is still directly used to transmit the HARQ-ACK information, the transmission effect is affected and some resources are wasted.

Figure 17:
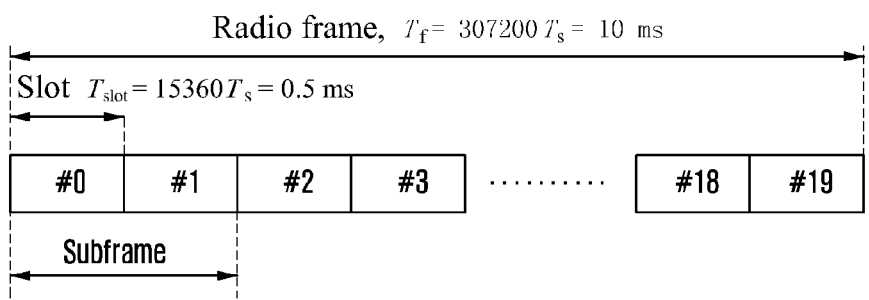
FIG. 17 illustrates a schematic diagram of a frame structure in an FDD system.

In a Long Term Evolution Advanced (LTE-A), each radio frame has a length of 10 milliseconds (ms), and each radio frame is equally divided into 10 subframes. A downlink transmission time interval (TTI) is defined on one subframe. FIG. 17 illustrates a schematic diagram of a frame structure in a frequency division duplex (FDD) system, wherein Tf shown in the figure represents the duration of a radio frame, Ts represents a sampling period, and each downlink subframe includes two slots, i.e., Tslot shown in the figure, and as shown in the figure, the first subframe includes two slots #0 and #1 shown in the figure. For the length of a general cyclic prefix (CP), each time slot includes 7 orthogonal frequency division multiplexing (OFDM) symbols; for the length of an extended CP, each time slot includes 6 OFDM symbols.

Figure 18:
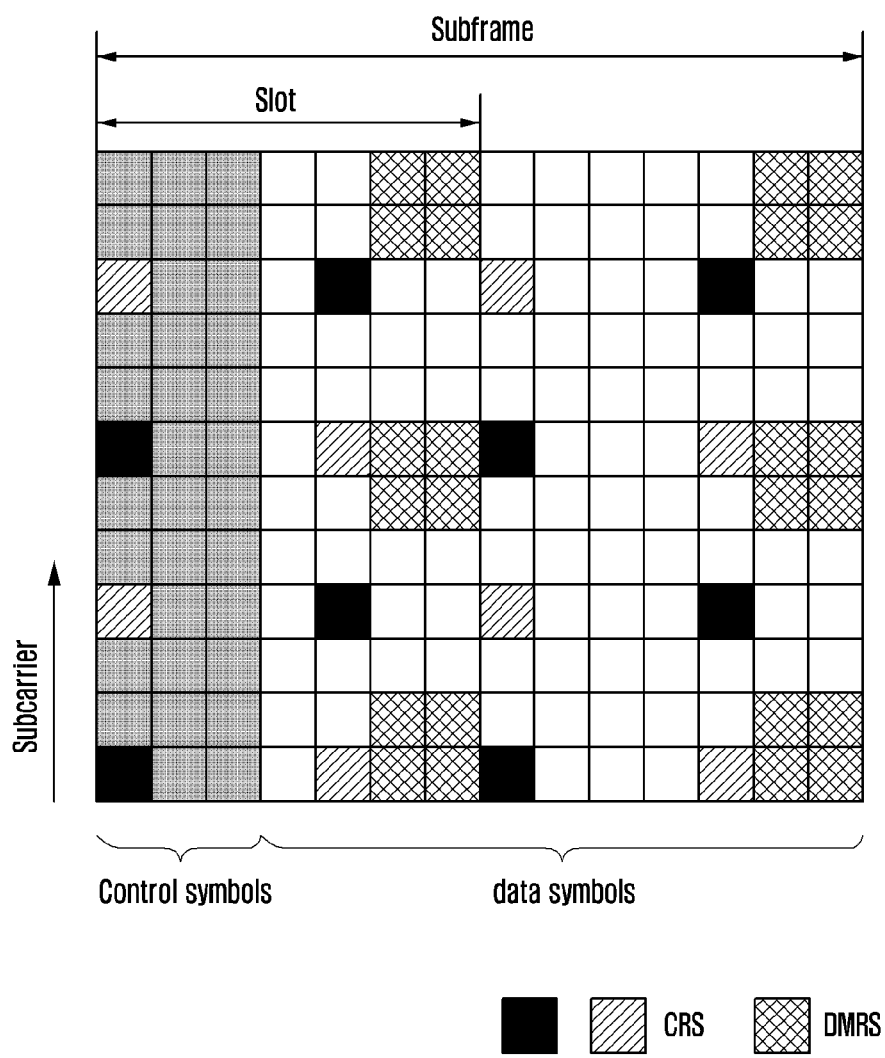
FIG. 18 illustrates a schematic diagram of a subframe structure in an LTE system.

FIG. 18 illustrates a schematic diagram of a subframe structure in an LTE system, wherein the first n OFDM symbols (such as control symbols shown in FIG. 18, n is equal to 1, 2, or 3) are used to transmit a physical downlink control channel (PDCCH), the PDCCH carries downlink control information (DCI) and other control information. The remaining OFDM symbols (such as data symbols shown in FIG. 18) are used to transmit a physical downlink shared channel (PDSCH). The basic granularity of resource allocation is a physical resource block (PRB) pair, where one PRB includes 12 consecutive subcarriers in frequency and corresponds to one time slot in time. Two PRBs within two slots on the same subcarrier within one subframe are referred to as one PRB pair. Within each of PRB pairs, each resource element (RE) is the smallest unit of time-frequency resources, that is, it is one subcarrier in frequency or one OFDM symbol in time. REs may be used for different functions respectively, for example, a portion of REs may be used to transmit cell-specific reference signals (CRS), user-specific demodulation reference signals (DMRS), and channel state information-reference signal (CSI-RS), PDCCH, PDSCH, and so on. For example, the REs filled with black color shown in FIG. 18 and the REs filled with hatches may be used to transmit the CRS, and the REs filled with grid may be used to transmit the DMRS.

In the LTE system, the PDSCH and physical uplink shared channel (PUSCH) are transmitted by scheduling the PDCCH or an enhanced physical downlink control channel (EPDCCH), wherein the resources for the PDSCH transmission and the PUSCH transmission are also allocated by resource allocation signaling in the PDCCH/EPDCCH. The maximum resources allocated for the PDSCH transmission and the PUSCH transmission are all PRB pairs in the entire system bandwidth, and the minimum resource allocated for the PDSCH transmission and the PUSCH transmission is one PRB pair in the entire system bandwidth, the granularity of resource allocation is one PRB pair. For a system with a normal CP, 14 OFDM symbols are included in the time domain, while for a system with an extended CP, 12 OFDM symbols are included in the time domain.

In order to enable the base station to determine an appropriate modulation and coding scheme (MCS) based on the quality of the channel when scheduling the PDSCH transmission, a UE needs to feed back channel state information (CSI), wherein a CSI report includes a periodic CSI report and an acyclic CSI report. In the LTE system, when the UE feeds back CSI, the following assumptions are made: obtaining the CP characteristics of the system based on detection, that is, determining whether it is an extended CP or a normal CP, and then determining the number of OFDM symbols of each subframe based on the CP characteristics; for the normal CP, each subframe includes 14 OFDM symbols, for the extended CP, each subframe includes 12 OFDM symbols; obtaining the number of ports of the CRS based on detection, wherein the number of ports of the specific CRS may be 1, 2, and 4, and determining which REs cannot be used for the PDSCH transmission based on the number of ports of the CRS; it is assumed that the first three OFDM symbols in each subframe are used for transmitting control signaling, but cannot be used for the PDSCH transmission.

In a new radio (NR) transmission system, the transmission resources have the following changes: the resources for transmitting the DCI no longer occupy the entire system bandwidth. For the normal CP, the time domain length of the resource blocks of the PDSCH transmission is no longer necessarily 14 OFDM symbols. It no longer mainly uses the CRS for demodulating the PDSCH, but mainly uses a user-specific demodulation reference signal (DMRS) to perform demodulation. After the foregoing change occurs, if the CSI is still computed according to the existing method, the resources occupied by the PDSCH assumed to compute the CSI are inconsistent with the resources for actual PDSCH transmission. Therefore, the computation of the CSI is not accurate, thereby affecting the transmission performance of the PDSCH and possibly wasting resources.

In order to make the objects, technical solutions and advantages of the present application clearer, the embodiments of the present application will be further described in detail below with reference to the accompanying drawings.

Figure 2:
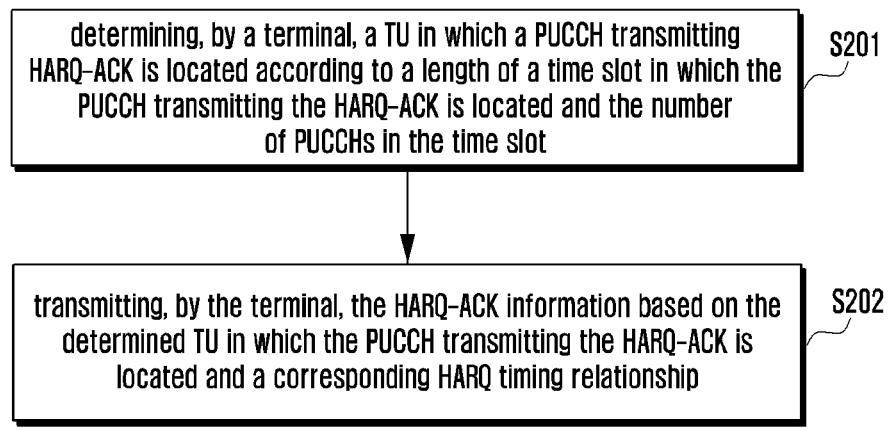
FIG. 2 is a schematic flowchart of a method for transmitting HARQ-ACK information according to an embodiment of the present disclosure.

An embodiment of the present application provides a method for transmitting HARQ-ACK information. As shown in FIG. 2, the method includes:

Step S201: determining, by a terminal, a time unit in which a PUCCH transmitting the HARQ-ACK is located according to a length of time slot of the time slot in which the PUCCH transmitting the HARQ-ACK is located and the number of PUCCHs in the time slot.

Step S202: transmitting, by the terminal, the HARQ-ACK information based on the determined time unit in which the PUCCH transmitting the HARQ-ACK is located and a corresponding HARQ timing relationship.

In the embodiment of the present application, step S201 includes any of the following conditions:

(1) if only one PUCCH is used for transmitting the HARQ-ACK in a time slot, a length of time slot is determined as a TU in which the PUCCH transmitting the HARQ-ACK is located.

Specifically, if only one PUCCH is used for transmitting the HARQ-ACK in one time slot, for example, the PUCCH transmitting the HARQ-ACK generated by the PDSCH is transmitted in the time slot n, the length of time slot is determined as the TU in which the PUCCH transmitting the HARQ-ACK is located, that is, the length of time slot in which the PUCCH transmitting HARQ-ACK is located is used as the TU, then the PDSCH is transmitted in the time slot n-k1, where k1 is referred as to a PDSCH-to-HARQ-feedback timing value, which may also be referred as to an HARQ timing relationship. In actual applications, the value of the HARQ timing relationship (the value of k1) is indicated by the field in the PDCCH scheduling PDSCH.

(2) if more than one PUCCHs are used for transmitting the HARQ-ACK in a time slot, a part of a time slot is determined as a TU in which the PUCCH transmitting the HARQ-ACK is located.

Figure 3:
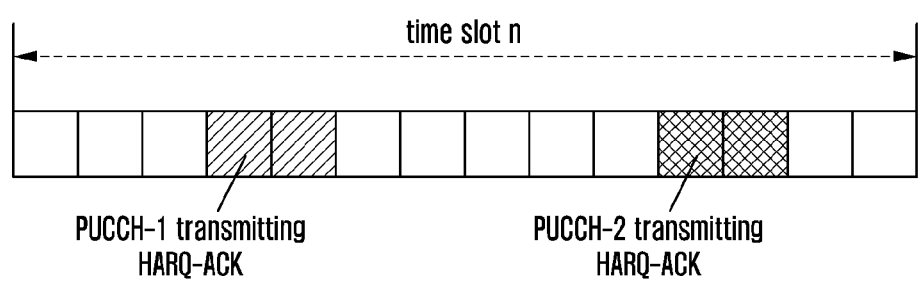
FIG. 3 is an exemplary diagram of multiple of PUCCHs in each time slot according to an embodiment of the present disclosure.

Each time slot may have multiple PUCCHs transmitting the HARQ-ACK of the dynamically scheduled PDSCH, the SPS PDSCH or the PDCCH indicating the SPS release, for example, as shown in FIG. 3, in the time slot n, there are two PUCCHs transmitting the HARQ-ACK, which are PUCCH-1 and PUCCH-2, respectively.

If there is more than one PUCCHs for transmitting the HARQ-ACK in one time slot, the length of time slot of the PUCCH in which the HARQ-ACK is transmitted cannot be used as the TU in the HARQ timing relationship k1, because it is impossible to distinguish which PUCCH in the time slot is used to transmit the HARQ-ACK, a method may indicate the HARQ timing relationship in this case, that is, a part of the a time slot is determined as the TU in which the PUCCH transmitting the HARQ-ACK is located.

Figure 4:
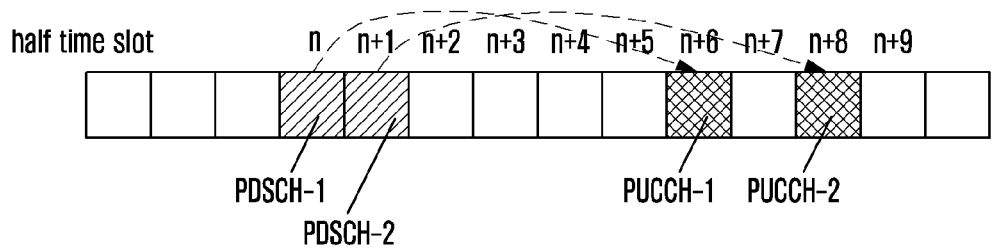
FIG. 4 is an exemplary diagram showing that the HARQ-ACK is transmitted on two PUCCHs in one time slot according to an embodiment of the present disclosure.

Specifically, the HARQ timing relationship k1 uses a part of a time slot as a TU. For example, as shown in FIG. 4, if there are two PUCCHs transmitting the HARQ-ACK in one time slot, k1 can use half time slot as a TU, PDSCH-1 is transmitted in the nth half time slot, and PDSCH-2 is transmitted in the (n+1)th half time slot, the HARQ-ACK generated by PDSCH-1 is transmitted in PUCCH-1 of (n+6)th (wherein, k1 is 6) half time slot, and the HARQ-ACK generated by PDSCH-2 is transmitted in PUCCH-2 of (n+8)th (wherein, k1 is 7) half time slot.

(3) if more than one PUCCHs are used for transmitting the HARQ-ACK in a time slot, a length of time slot is determined as a TU in which the PUCCH transmitting the HARQ-ACK is located, and an indication information is received, wherein the indication information is used to indicate to transmit the HARQ-ACK on a specific PUCCH in a time slot in which the HARQ-ACK is transmitted, determined according to a length of time slot in TU.

Each time slot may have multiple PUCCHs transmitting the HARQ-ACK of the dynamically scheduled PDSCH, the SPS PDSCH or the PDCCH indicating the SPS release, for example, as shown in FIG. 3, in the time slot, there are two PUCCHs transmitting the HARQ-ACK, which are respectively PUCCH-1 and PUCCH-2.

If more than one PUCCHs are used for transmitting the HARQ-ACK in one time slot, the length of time slot of the PUCCH transmitting the HARQ-ACK cannot be used as the TU in the HARQ timing relationship k1, because it is impossible to distinguish which PUCCH in the time slot is used to transmit the HARQ-ACK, and another method may indicate an HARQ timing relationship in this case, that is, determine a length of time slot as a TU in which the PUCCH transmitting the HARQ-ACK is located, and receive indication information which is used for indicating that the information is used to indicate to transmit the HARQ-ACK on a specific PUCCH in a time slot in which the HARQ-ACK is transmitted, determined according to a length of time slot in TU.

Figure 5:
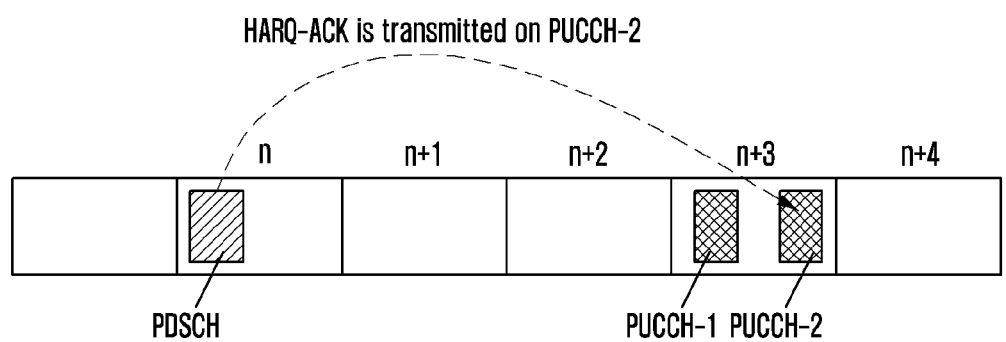
FIG. 5 is an exemplary diagram of two pieces of timing relationship indication information according to an embodiment of the present application.

Specifically, the HARQ timing relationship k1 uses one time slot as a TU. Since there are multiple PUCCHs for transmitting the HARQ-ACK in each time slot, there is another timing relationship indication information indicating which PUCCH is used to transmit the HARQ-ACK in the time slot, such that the indication information of the timing relationship has two parts, the first part indicates the time slot transmitting the HARQ-ACK, the second part indicates which PUCCH in the time slot is used to transmit the HARQ-ACK, and the second part can also be determined by the resource indication of the HARQ-ACK. For example, there are two PUCCHs to transmit the HARQ-ACK in one time slot, wherein k1 uses the time slot as the TU. As shown in FIG. 5, PDSCH-1 is transmitted in the nth time slot, and HARQ-ACK generated by PDSCH-1 is transmitted in the PUCCH of the (n+3)th (wherein, k1 is 3) time slot, and two PUCCHs are in the time slot n+3, which are PUCCH-1 and PUCCH-2 respectively, and the second part indication information indicates PUCCH-2 in the time slot.

Figure 6:
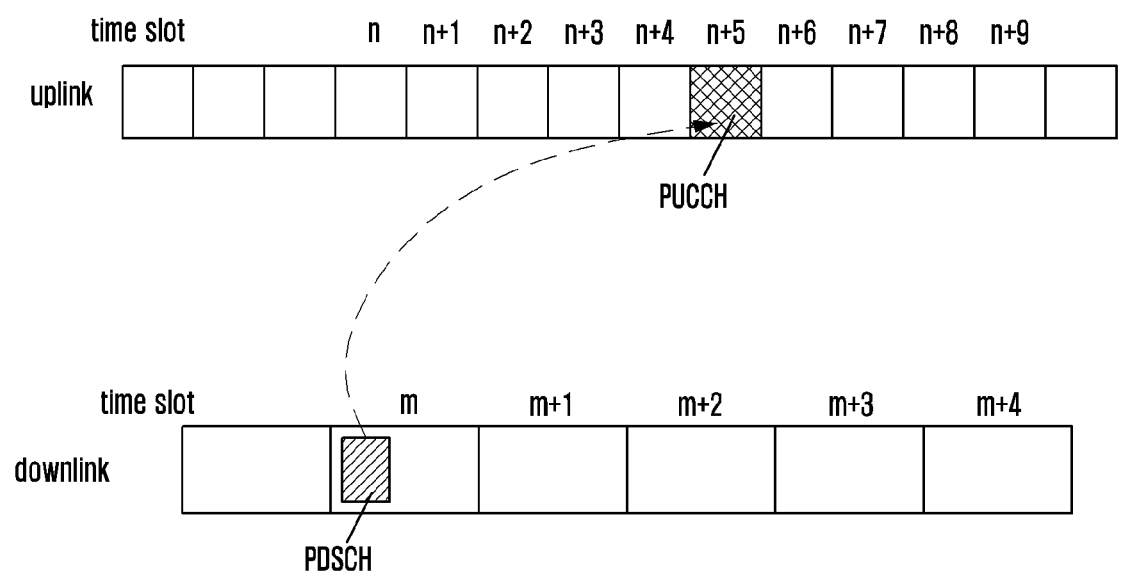
FIG. 6 is an exemplary diagram showing that the length of time slot of the PUCCH transmitting the HARQ-ACK is different from the length of time slot of the PDSCH generating the HARQ-ACK according to an embodiment of the present disclosure.

Since the subcarrier space configuration may be different at different times of different serving cells and the same serving cell, the length of time slot may be different. In addition, the configuration of the subcarrier space of the PUCCH transmitting the HARQ-ACK and the configuration of the subcarrier space of the PDSCH generating the HARQ-ACK may be different, then the length of time slot of the PUCCH transmitting the HARQ-ACK is different from the length of time slot of the PDSCH generating the HARQ-ACK, as shown in FIG. 6.

In the embodiment of the present application, after determining a part of a time slot as a TU in which the PUCCH transmitting the HARQ-ACK is located, that is, when the HARQ timing relationship of step S201 is indicated by the foregoing condition (2), the HARQ timing relationship k1 uses a part of a time slot as the TU, as shown in FIG. 4, if there are two PUCCHs for transmitting the HARQ-ACK in one time slot, then k1 can use half time slot as the TU, PDSCH-1 is transmitted in the nth half time slot, and PDSCH-2 is transmitted in the (n+1)th half time slot, the HARQ-ACK generated by the PDSCH-1 is transmitted in the PUCCH-1 of (n+6)th (wherein, k1 is 6) half time slot, and the HARQ-ACK generated by PDSCH-2 is transmitted in the PUCCH-2 of the (n+8)th (wherein, k1 is 7) half time slot, then when performing step S202, specifically including:

Step S2021: determining a reference point where a PDSCH-to-HARQ-feedback timing value is equal to 0 according to an overlapping between the TU in which the PDSCH is located and the TU in which the PUCCH transmitting the HARQ-ACK is located;

Step S2022: transmitting the HARQ-ACK information according to the reference point and the corresponding HARQ-ACK timing relationship.

Figure 7:
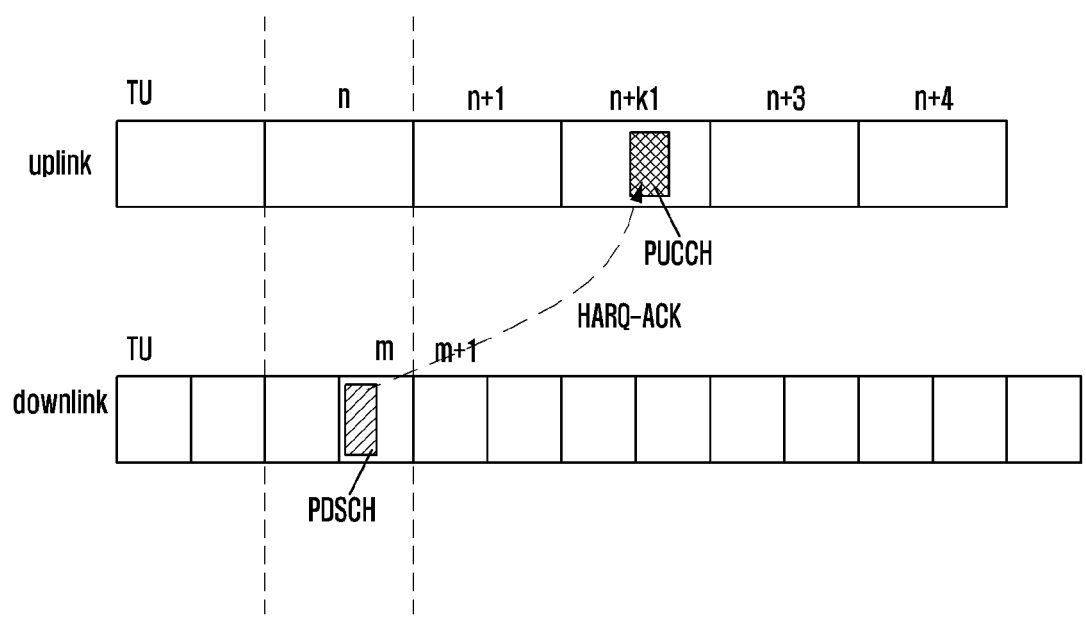
FIG. 7 is an exemplary diagram showing that more than one TU in which the PDSCH is transmitted completely overlaps with one TU in which the PUCCH transmitting the HARQ-ACK is located according to an embodiment of the present disclosure.

Wherein, step S2021 includes any of the following conditions:

(1) if the TU in which the PDSCH is located is less than or equal to the TU in which the PUCCH transmitting the HARQ-ACK is located and more than one TU in which the PDSCH is transmitted completely overlaps with one TU in which the PUCCH transmitting the HARQ-ACK is located, determining one TU in which the PUCCH transmitting the HARQ-ACK is located as the reference point where the PDSCH-to-HARQ-feedback timing value is equal to 0;

Specifically, in combination with step S2022, if the TU in which the PDSCH is transmitted (for example, the length of time slot or a part of the length of time slot (for example, half time slot length)) is less than or equal to the TU (for example, half time slot length) in which the PUCCH transmitting the HARQ-ACK generated by the PDSCH is located, and multiple TUs in which the PDSCH is transmitted completely overlaps with the TU in which the PUCCH transmitting the HARQ-ACK generated by the PDSCH is located, as shown in FIG. 7, assuming that the PDSCH generating the HARQ-ACK or the PDCCH indicating the SPS release is transmitted within the TU m, and the two TUs m completely overlap with the TU n in which the HARQ-ACK is transmitted, then the PDSCH or the HARQ-ACK of the PDCCH indicating the SPS release is transmitted within the TU n+k1.

(2) if the TU in which the PDSCH is transmitted is greater than the TU in which the PUCCH transmitting the HARQ-ACK is located, and more than one TU in which the PUCCH transmitting the HARQ-ACK is located completely overlaps with one TU in which the PDSCH is transmitted, determining one of the more than one overlapped TUs in which the PUCCH transmitting the HARQ-ACK is located as the reference point where the PDSCH-to-HARQ-feedback timing value is equal to 0.

Specifically, in combination with step S2022, the TU in which the PDSCH is transmitted (for example, the length of time slot or a part of the length of time slot (for example, half time slot length)) is greater than the TU (for example, half time slot length) in which the PUCCH of the HARQ-ACK generated by the PDSCH is transmitted, and the TU in which the PDSCH is transmitted completely overlaps with the multiple TUs in which the PUCCH transmitting the HARQ-ACKs generated by the PDSCHs is located, and then one of the multiple TUs in which the PUCCH transmitting the HARQ-ACK generated by the PDSCH is located, which is overlapped with the TU in which the PDSCH is transmitted is selected as the reference point where k1 is equal to 0.

In this embodiment of the present application, a reference point whose TU is the HARQ timing relationship k1 which is equal to 0 may be predefined; for example, selecting a first TU as the reference point where k1 is equal to 0 by a protocol, or selecting a second TU as the reference point where k1 is equal to 0, or selecting the last TU as the reference point where k1 is equal to 0.

It is also possible to select a TU as the reference point where the PDSCH-to-HARQ-feedback timing value is equal to 0 according to the service requirement. For example, the last time is selected as the reference point where k1 is equal to 0 according to the service requirement, or selecting the TU except the last TU as the reference point where k1 is equal to 0.

In actual applications, if the service is an eMBB service, the last TU in the overlapped TUs in which the HARQ-ACK is transmitted may be selected as a reference point where the PDSCH-to-HARQ-feedback timing value is equal to 0, because the delay requirement is not very high for the eMBB service, and the last TU can be selected as the reference point where k1 is equal to 0.

Figure 8:
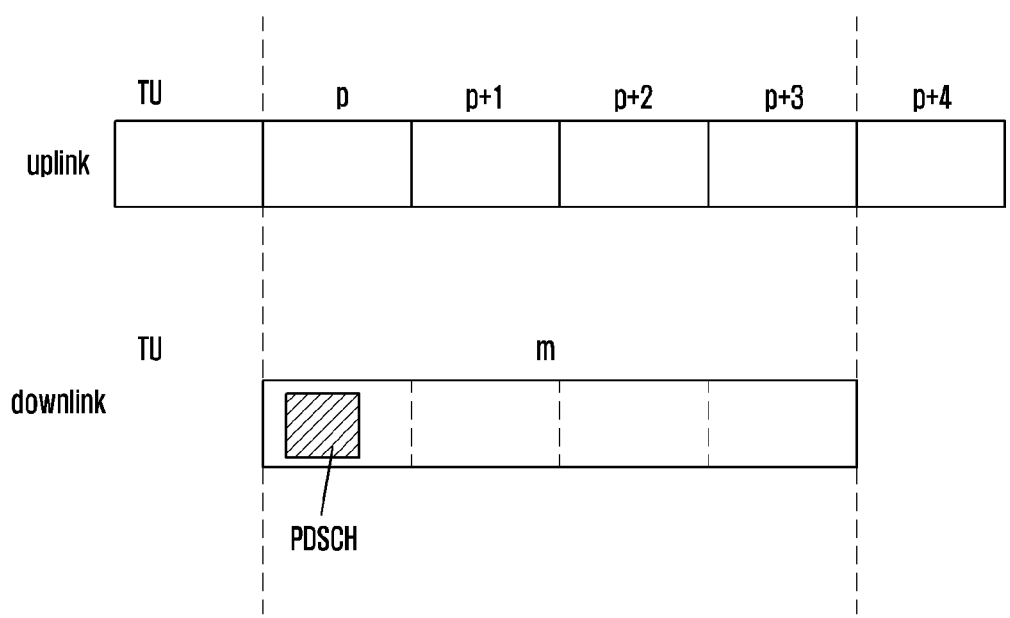
FIG. 8 is an exemplary diagram showing that more than one TU in which the PUCCH transmitting the HARQ-ACK is located completely overlaps with the TU in which the PDSCH is transmitted according to an embodiment of the present disclosure.

If the service is the URLLC service, one of the overlapped TUs in which the HARQ-ACK is transmitted except the last TU is as the reference point where the PDSCH-to-HARQ-feedback timing value is equal to 0, because the delay requirement is high for the URLLC service, if the last TU is selected as the reference point where k1 is equal to 0, the delay requirement may not be satisfied. For example, as shown in FIG. 8, it is assumed that the PDSCH generating the HARQ-ACK or the PDCCH indicating the SPS release is transmitted in the TU m, the TU m and the four TUs p, p+1, p+2 and p+3 in which the HARQ-ACK is transmitted, if the last TU p+3 is used as the reference point where k1 is equal to 0, and all the values of k1 is greater than or equal to 0, therefore, the HARQ-ACK which is generated by the PDSCH and is transmitted in the TU m can only be transmitted in p+3 and after p+3, and when the PDSCH is transmitted at the front OFDM symbol within the TU m, it is necessary to transmit the HARQ-ACK of the PDSCH in the time p+1 or the time p+2 in order to satisfy the delay requirement, and the TUs p, p+1 and p+2 are used as the reference point where k1 is equal to 0, and one of the TUs can be determined as a reference point where k1 is equal to 0 by signaling configuration or predefined by the protocol.

Or, if the service is the URLLC service, the last TU in the overlapped TUs transmitting the HARQ-ACK may be selected as a reference point whose PDSCH-to-HARQ-feedback timing value is equal to 0, and the value of the HARQ timing relationship is determined to be an arbitrary integer. That is, the last TU p+3 is still selected as the reference point where k1 is equal to 0, but the value of k1 may have a negative value, for example, k1=−1, so that when k1 is equal to −1, the HARQ-ACK is transmitted in TU p+2.

In practical applications, the service requirement is determined by at least one of the following: a scrambled RNTI of the PDCCH scheduling the PDSCH; DCI of the PDCCH, that is, a service type can be determined by the information such as the scrambled RNTI of the PDCCH scheduling the PDSCH or DCI format of the PDCCH, in other words, determining the last TU p+3 as the reference point where k1 is equal to 0 according to the scrambled RNTI of the PDCCH scheduling the PDSCH or DCI format of the PDCCH, or determining the TUs p, p+1 and p+2 as the reference point where k1 is equal to 0, for example, when the scrambled RNTI of the PDCCH scheduling the PDSCH is RNTI-1, then the last TU p+3 is used as the reference point where k1 is equal to 0, when the scrambled RNTI of the PDCCH scheduling the PDSCH is RNTI-2, then the last TU p+1 is used as the reference point where k1 is equal to 0.

Figure 9:
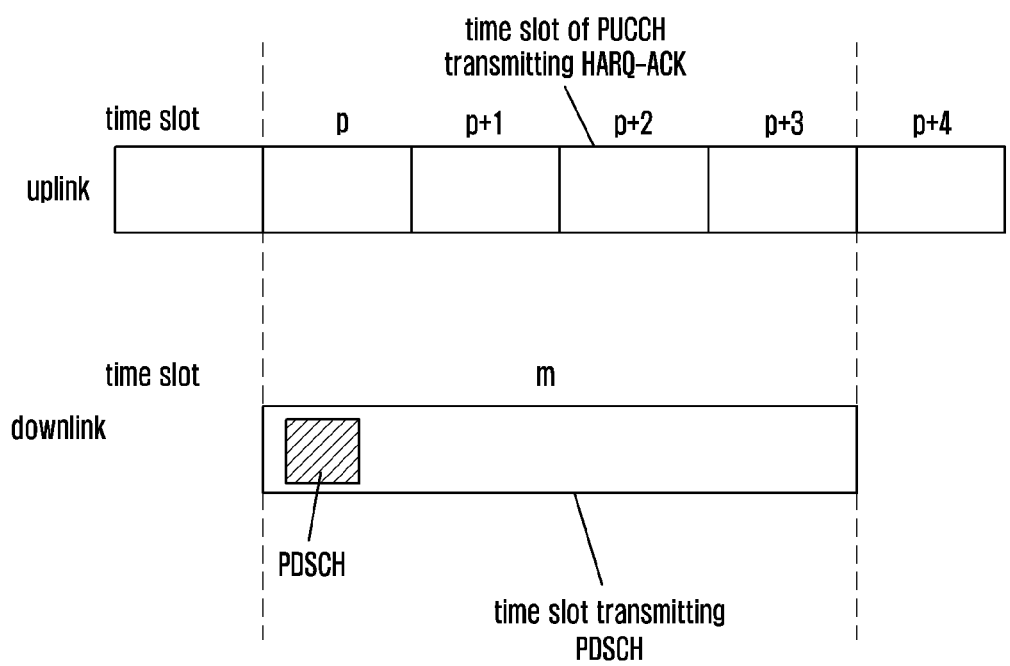
FIG. 9 is an exemplary diagram showing that one time slot in which the PDSCH is located completely overlaps with multiple time slots in which the PUCCH transmitting the HARQ-ACK generated by the PDSCH is located according to an embodiment of the present disclosure.

In another embodiment of the present application, when the TU in which the PDSCH is transmitted, the TU in which the PUCCH transmitting the HARQ-ACK generated by the PDSCH is located is in the time slot unit, if the time slot length of the PDSCH is greater than the time slot length of the PUCCH transmitting the HARQ-ACK generated by the PDSCH, then the time slot in which the PDSCH is located completely overlaps with the time slot of the PUCCH transmitting the HARQ-ACK generated by the PDSCH, for example, as shown in FIG. 9, the time slot in which the PDSCH is located completes overlaps with four time slots of the PUCCH transmitting the HARQ-ACK generated by the PDSCH. At this time, reference may be made to the method of the condition (2) of the above step S2021, and details are not described herein again.

Figure 10:
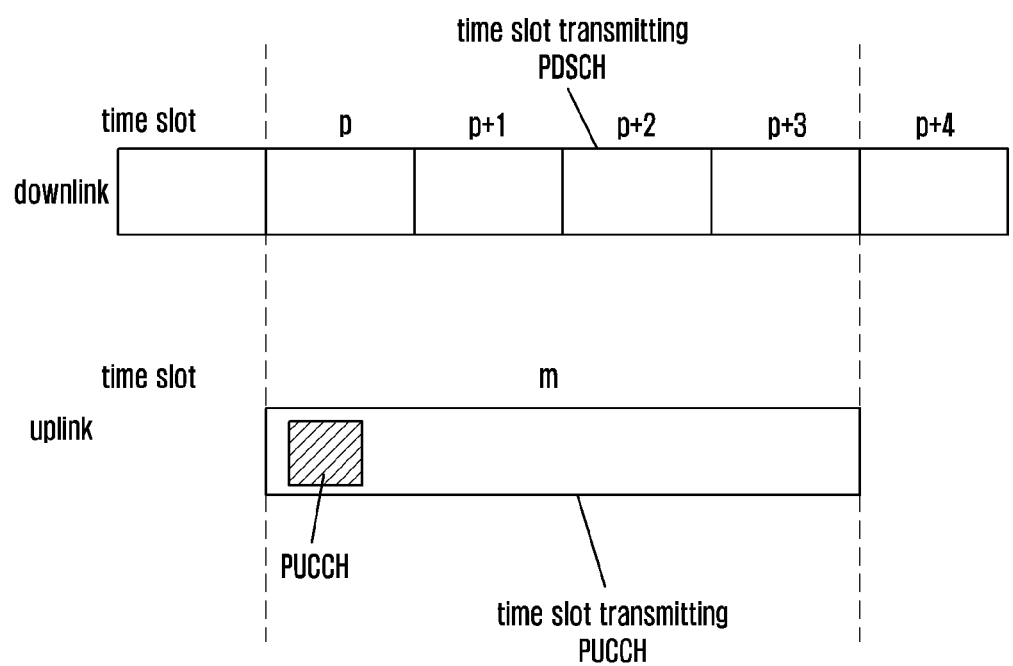
FIG. 10 is an exemplary diagram showing that one time slot in which the PUCCH transmitting the HARQ-ACK generated by the PDSCH is located completely overlaps with multiple time slots in which the PDSCH is located according to an embodiment of the present disclosure.

In still another embodiment of the present application, if the TU in which the PDSCH is transmitted, the TU in which the PUCCH transmitting the HARQ-ACK generated by the PDSCH is located is in the time slot unit, and if the time slot length of the PDSCH is less than or equal to the time slot of the PUCCH transmitting the HARQ-ACK generated by the PDSCH is located, then one time slot in which the PUCCH transmitting the HARQ-ACK generated by the PDSCH will completely overlap with the multiple time slots in which the PDSCH is located, for example, as shown in FIG. 10, at this time, reference may be made to the method of the condition (1) of the above step S2021, and details are not described herein again.

Further, step S2021 further includes any of the following conditions:

(3) if the TU in which the PDSCH is transmitted dose not completely overlap with the TU in which the PUCCH transmitting the HARQ-ACK is located, determining one of the more than one TU in which the PUCCH transmitting the HARQ-ACK is located which is overlapped with any TU in which the PDSCH is transmitted as the reference point where the PDSCH-to-HARQ-feedback timing value is equal to 0;

Wherein, more than one TUs in which PUCCH transmitting the HARQ-ACK is located may completely overlap or partially overlap with any TU in which the PDSCH is transmitted.

Figure 11:
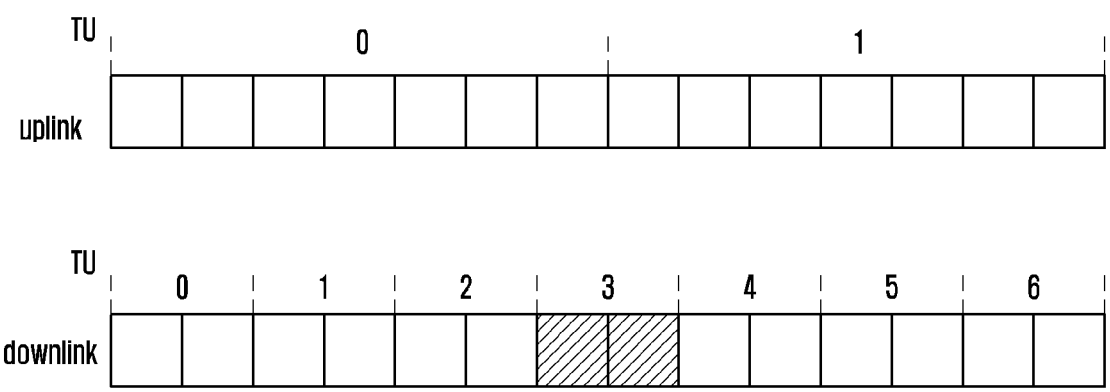
FIG. 11 is an exemplary diagram showing that the TU in which the PDSCH is transmitted does not completely overlap with the TU in which the PUCCH transmitting the HARQ-ACK is located according to an embodiment of the present disclosure.

In practical applications, if at least one of the TUs in which the PDSCH is transmitted and the TU in which the PUCCH transmitting the HARQ-ACK generated by the PDSCH is located is not in the time slot unit, regardless of the length of time slot of the PDSCH is greater than or less than the length of time slot of the PUCCH transmitting the HARQ-ACK generated by the PDSCH, it is possible to occur the condition that one TU in which the PDSCH is located may partially overlap with multiple TUs of the PUCCH transmitting the HARQ-ACK generated by the PDSCH, for example, the length of time slot of the PDSCH is less than the length of time slot of the PUCCH transmitting the HARQ-ACK generated by the PDSCH, as shown in FIG. 11, if the PDSCH and the PUCCH has the same subcarrier space, then the TU of the PDSCH is two OFDM symbols, and the TU of the PUCCH is 7 OFDM symbols, a TU 3 in which the PDSCH is located, the TU 0 of the PUCCH transmitting the HARQ-ACK generated by the PDSCH and the TU 1 of the PUCCH transmitting the HARQ-ACK generated by the PDSCH do not completely overlap with each other.

In the embodiment of the present application, in combination with step S2022, regardless of the TU in which the PDSCH is transmitted is the same as the TU in which the PUCCH transmitting the HARQ-ACK generated by the PDSCH is located, and regardless of the configuration of the subcarrier space transmitting the PDSCH is the same as the configuration of the subcarrier space of the PUCCH transmitting the HARQ-ACK, one TU is selected from the multiple TUs of the PUCCH transmitting the HARQ-ACK generated by the PDSCH overlapped (completely overlapped or partially overlapped) with the TU in which the PDSCH is transmitted as the reference point where k1 is equal to 0.

In this embodiment of the present application, a TU may be predefined as a reference point whose HARQ timing relationship k1 is equal to 0; for example, the first TU is selected by the protocol as a reference point whose k1 is equal to 0, or the second TU is selected as a reference point whose k1 is equal to 0, or the last TU is selected as a reference point whose k1 is equal to 0.

It is also possible to select a TU as the reference point where a PDSCH-to-HARQ-feedback timing value is equal to 0, for example, the last TU is selected according to the service requirement as a reference point whose k1 is equal to 0, or the TU except the last TU is selected as a reference point whose k1 is equal to 0.

In practical applications, if the service is the eMBB service, the last TU in the overlapped TUs in which the HARQ-ACK is transmitted may be selected as the reference point where a PDSCH-to-HARQ-feedback timing value is equal to 0, because the delay requirement is not very high for the eMBB service, therefore, the last TU is selected as a reference point whose k1 is equal to 0

If the service is the URLLC service, one of the overlapped TUs in which the HARQ-ACK is transmitted except the last TU may be selected as the reference point where a PDSCH-to-HARQ-feedback timing value is equal to 0, because the high delay requirement for the URLLC service, if the last TU is selected as the reference point where k1 is equal to 0, the time delay requirement may not be satisfied, for example, assuming that the PDSCH generating the HARQ-ACK or the PDCCH indicating the SPS release is transmitted within the TU m, and the TU m completely overlaps with the four TUs p, p+1, p+2 and p+3 in which the HARQ-ACK is transmitted, if the last TU p+3 is used as the reference point where k1 is equal to 0, and all the values of k1 are greater than or equal to 0, therefore, the HARQ-ACK which is generated by the PDSCH and is transmitted in the TU m can only be transmitted in p+3 and after p+3, and when the PDSCH is transmitted at the front OFDM symbol within the TU m, it is necessary to transmit the HARQ-ACK of the PDSCH in the TU p+1 or the TU p+2 in order to satisfy the delay requirement, and the TUs p, p+1 and p+2 are used as the reference point where k1 is equal to 0, and one of the TUs can be determined as a reference point where k1 is equal to 0 by signaling configuration or predefined by the protocol.

Or, if the service is the URLLC service, the last TU in the overlapped TUs transmitting the HARQ-ACK may be selected as a reference point where the PDSCH-to-HARQ-feedback timing value is equal to 0, and the value of the HARQ timing relationship is determined as an arbitrary integer. That is, the last TU p+3 is still selected as the reference point where k1 is equal to 0, but the value of k1 may have a negative value, for example, k1=−1, so that when k1 is equal to −1, HARQ-ACK is transmitted in TU p+2.

In practical applications, the service requirement is determined by at least one of the following: a scrambled RNTI of the PDCCH scheduling the PDSCH; DCI of the PDCCH, that is, a service type can be determined by the information such as the scrambled RNTI of the PDCCH scheduling the PDSCH or DCI of the PDCCH, in other words, determining the last TU p+3 as the reference point where k1 is equal to 0 according to the scrambled RNTI of the PDCCH scheduling the PDSCH or DCI format of the PDCCH, or determining the TUs p, p+1 and p+2 as the reference point where k1 is equal to 0, for example, when the scrambled RNTI of the PDCCH scheduling the PDSCH is RNTI-1, then the last TU p+3 is used as the reference point where k1 is equal to 0, when the scrambled RNTI of the PDCCH scheduling the PDSCH is RNTI-2, then the last TU p+1 is used as the reference point where k1 is equal to 0.

The above three conditions shows how to determine the reference point where k1 is equal to 0 according to the overlapping between the TU in which the PDSCH is transmitted and the TU in which the PUCCH transmitting the HARQ-ACK is located, in some cases, the PDSCH is transmitted in a part of time within the TU in which the PDSCH is transmitted, for example, the TU in which the PDSCH is transmitted is a time slot which containing 14 OFDM symbols, and the PDSCH is transmitted in the second and the third OFDM symbols in the 14 symbols in the time slot. If the reference point where k1 is equal to 0 is determined according to the overlapping degree between the TU in which the PDSCH is transmitted and the TU in which the PUCCH transmitting the HARQ-ACK is located, which may cause a very large time delay.

In the embodiment of the present application, a reference point where a PDSCH-to-HARQ-feedback timing value is equal to 0 is determined according to the overlapping degree between the OFDM symbol in the time slot in which the PDSCH is actually transmitted and the TU in which the PUCCH transmitting the HARQ-ACK is located, to further transmit the HARQ-ACK information according to the reference point and the corresponding HARQ-ACK timing relationship.

Figure 12:
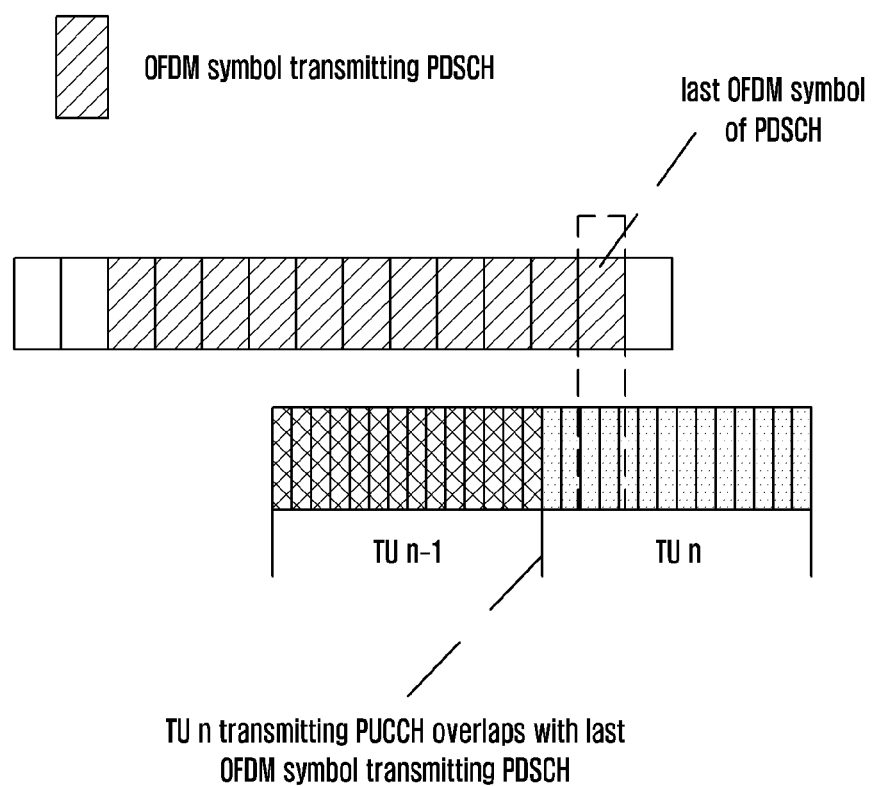
FIG. 12 is a first exemplary diagram showing that the OFDM symbol in the time slot in which the PDSCH is actually transmitted overlaps with the TU in which the PUCCH transmitting the HARQ-ACK is located according to an embodiment of the present disclosure.

Specifically, determining the reference point where k1 is equal to 0 according to the overlapping between the OFDM symbol in which the PDSCH is actually transmitted and the TU in which the PUCCH transmitting the HARQ-ACK is located, including any of the following cases:

(1) determining the reference point where k1 is equal to 0, by the overlapping between the last OFDM symbol in which the PDSCH is actually transmitted and the TU in which the PUCCH transmitting the HARQ-ACK is located, that is, if the last OFDM symbol in which the PDSCH is actually transmitted only overlaps with one TU in which the PUCCH transmitting the HARQ-ACK is located, the one TU in which the PUCCH transmitting the HARQ-ACK is located is determined as the reference point where a PDSCH-to-HARQ-feedback timing value is equal to 0;

As shown in FIG. 12, when the last OFDM symbol in which the PDSCH is actually transmitted overlaps with the one TU in which the PUCCH transmitting the HARQ-ACK is located, the TU in which the PUCCH transmitting the HARQ-ACK is located is determined as the reference point where k1 is equal to 0.

(2) if the last OFDM symbol in which the PDSCH is actually transmitted overlaps with the more than one TU in which the PUCCH transmitting the HARQ-ACK is located, determining the last TU in which the PUCCH transmitting the HARQ-ACK is located as the reference point where the PDSCH-to-HARQ-feedback timing value is equal to 0.

Figure 13:
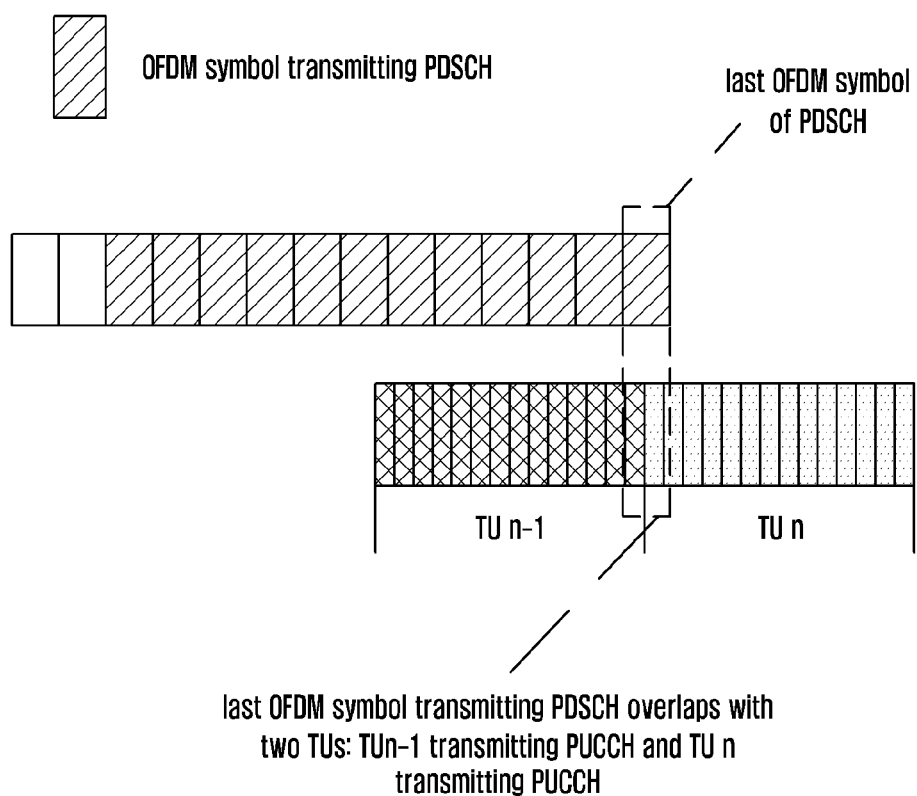
FIG. 13 is a second exemplary diagram showing that the OFDM symbol in the time slot in which the PDSCH is actually transmitted overlaps with the TU in which the PUCCH transmitting the HARQ-ACK is located according to an embodiment of the present disclosure.

As shown in FIG. 13, when the last OFDM symbol in which the PDSCH is actually transmitted overlaps with the more than one TU in which the PUCCH transmitting the HARQ-ACK is located, the last TU in which the PUCCH transmitting the HARQ-ACK is located is determined as the reference point where k1 equal to 0, because the UE will only transmit the HARQ-ACK in the last TU in which the PUCCH transmitting the HARQ-ACK is located and the subsequent TUs, the UE will not transmit the HARQ-ACK generated by the PDSCH in the TU in which the PUCCH transmitting the HARQ-ACK is located before the ending of the PDSCH.

As shown in FIG. 13, the last OFDM symbol transmitting the PDSCH overlaps with the TU n−1 in which the PUCCH transmitting the HARQ-ACK is located and the TU n in which the PUCCH transmitting the HARQ-ACK is located, but when the TU n−1 in which the PUCCH transmitting the HARQ-ACK is located ends, the last OFDM symbol transmitting the PDSCH does not end, therefore, the HARQ-ACK of the PDSCH cannot be transmitted in the TU n−1, if the TU n−1 is used as the reference point where k1 is equal to 0, then the HARQ-ACK is not transmitted in the TU whose k1 is equal to 0, which is equivalent to wasting the timing relationship indication information that k1 is equal to 0, therefore, the TU n is used as the reference point where k1 is equal to 0, then the HARQ-ACK of the PDSCH may be transmitted in the TU n.

Figure 14:
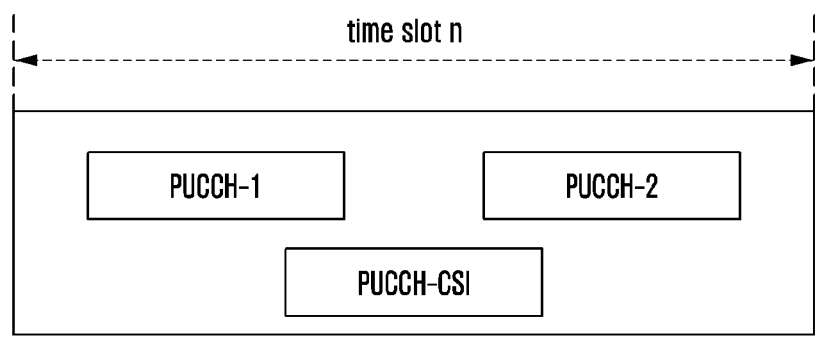
FIG. 14 is a first exemplary diagram of multiplexing the CSI and the HARQ-ACK according to an embodiment of the present disclosure.

In the embodiment of the present application, when the PUCCH of the CSI overlaps with the at least two PUCCHs transmitting the HARQ-ACK in one time slot, the CSI and the HARQ-ACK may be multiplexed in any of the following manners:

(1) the CSI is multiplexed in the last PUCCH transmitting the HARQ-ACK;

Taking the two PUCCHs transmitting the HARQ-ACK in one time slot as an example, if the PUCCH transmitting the CSI overlaps with the two PUCCHs transmitting the HARQ-ACK, the CSI is multiplexed in the last PUCCH transmitting the HARQ-ACK, such that the timing relationship of the HARQ-ACK can be satisfied. As shown in FIG. 14, the PUCCH-1 and PUCCH-2 transmitting the HARQ-ACK partially overlap with the PUCCH-CSI transmitting the CSI, and the CSI is multiplexed in the subsequent PUCCH-2.

(2) the CSI is multiplexed in the first PUCCH transmitting the HARQ-ACK that satisfies a delay requirement.

Figure 15:
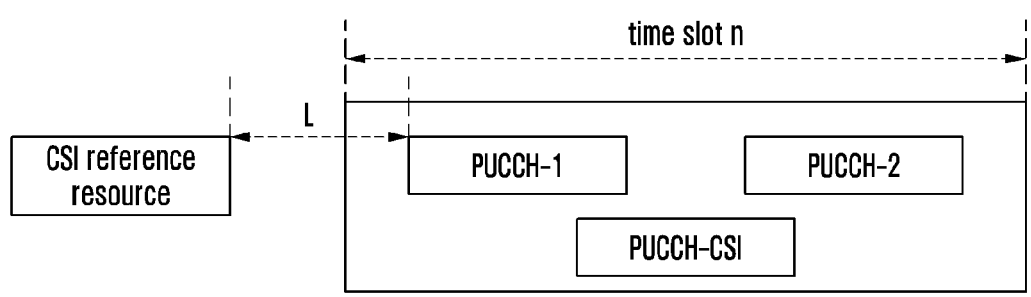
FIG. 15 is a second exemplary diagram of multiplexing the CSI and the HARQ-ACK according to an embodiment of the present disclosure.

Taking the two PUCCHs transmitting the HARQ-ACK in one time slot as an example, if the PUCCH transmitting the CSI overlaps with the two PUCCHs transmitting the HARQ-ACK, the CSI is multiplexed in the first PUCCH transmitting the HARQ-ACK that satisfies the delay requirement. In the PUCCH of the ACK, such that the timing relationship of the HARQ-ACK can be satisfied, and the CSI can be transmitted as fast as possible. As shown in FIG. 15, the PUCCH-1 and the PUCCH-2 transmitting the HARQ-ACK partially overlap with the PUCCH-CSI transmitting the CSI. If the time interval L between the PUCCH-1 transmitting the HARQ-ACK and the reference resource of the CSI is greater than or equal to the delay processing requirement T of the CSI, the CSI is multiplexed in the first PUCCH-1 transmitting the HARQ-ACK that satisfies the delay requirement.

In the embodiment of the present application, if the number of bits of HARQ-ACK is semi-statically determined by the high layer signaling configuration, the PDCCH scheduling the PDSCH further includes an HARQ-ACK bit number indication information field. That is, in the embodiment of the present application, one HARQ-ACK bit number indication information field may be added into the PDCCH scheduling the PDSCH, indicating the number of bits of HARQ-ACK.

Specifically, the number of bits indicating the HARQ-ACK is the number of bits of HARQ-ACK generated by one PDSCH; or the number of bits indicating the HARQ-ACK is the number of bits of HARQ-ACK determined according to a set of downlink time slots in which the HARQ-ACK is fed back in any of uplink subframes.

As an example, the HARQ-ACK bit number indication information field is 1 bit as an example: if the bit value is "0", it indicates that the number of bits of HARQ-ACK is the number of bits of HARQ-ACK generated by one PDSCH; if the bit value is "1", it indicates that the number of bits of HARQ-ACK can be determined according to the set of downlink time slots that may be required to feed back the HARQ-ACK in the uplink subframe n.

For example, the UE is configured with 4 serving cells, and each serving cell may need to include 4 elements in a set of downlink time slots in which the HARQ-ACK is fed back in the uplink time slot n, that is, each serving cell has 4 pieces of HARQ-ACK feedback information of the downlink time slot to be transmitted in one uplink time slot n, that is, the set of downlink time slots in which all downlink time slots that need or may need to feed back the HARQ-ACK in the uplink subframe n includes 16 downlink time slots in four serving cells. In this way, the total number of bits of HARQ-ACK transmitted by the PUCCH in one uplink time slot is 4*4=16 bits.

If the UE is in the four serving cells, the UE learns that the base station transmits the PDSCH or the PDCCH indicating the SPS release in only one downlink time slot of one serving cell (for example, the UE only receives one PDCCH scheduling the PDSCH, and the HARQ-ACK bit number indication information value in the PDCCH is 0), that is, if only one downlink time slot of one serving cell has the transmission of the HARQ-ACK feedback information, the number of bits of the HARQ-ACK feedback information is q (wherein, q may be 1 or 2, which can be determined according to the transmission mode of the serving cell, for example, the transmission mode of the serving cell supports one transport block transmission, q is 1).

If the UE is in the four serving cells, the UE learns that the base station transmits the PDSCH or the PDCCH indicating the SPS release in at least two downlink time slots of one serving cell or multiple serving cells (for example, the UE receives one PDCCH scheduling the PDSCH, and the HARQ-ACK bit number indication information value in the PDCCH is equal to 1, or the UE receives the at least two PDCCHs scheduling the PDSCHs), that is, if the HARQ-ACK feedback information is transmitted in the at least two downlink time slots, the number of bits of the HARQ-ACK feedback information is the total number of HARQ-ACK bits corresponding to all downlink time slots in the foregoing set.

Figure 16:
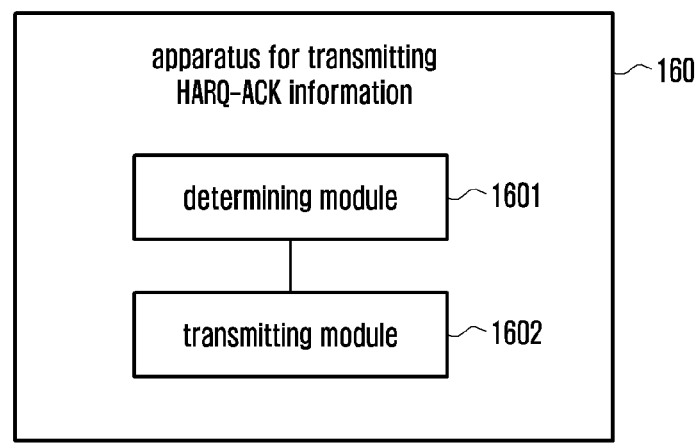
FIG. 16 is a schematic structural diagram of an apparatus for transmitting HARQ-ACK information according to an embodiment of the present disclosure.

The embodiment of the present application further provides an apparatus for transmitting HARQ-ACK information. As shown in FIG. 16, the apparatus 160 may include a determining module 1601 and a transmitting module 1602, wherein, the determining module 1601, configured to determine a TU in which a PUCCH transmitting the HARQ-ACK is located according to a length of time slot of the time slot in which the PUCCH transmitting the HARQ-ACK is located and the number of PUCCHs in the time slot;

the transmitting module 1602, configured to transmit the HARQ-ACK information based on the determined TU in which the PUCCH transmitting the HARQ-ACK is located and the corresponding HARQ timing relationship.

In an alternative implementation, the determining module 1601 is specifically configured for any one of the following conditions:

if only one PUCCH is used for transmitting the HARQ-ACK in a time slot, a length of time slot is determined as a TU in which the PUCCH transmitting the HARQ-ACK is located;

if more than one PUCCHs are used for transmitting the HARQ-ACK in a time slot, a part of a time slot is determined as a TU in which the PUCCH transmitting the HARQ-ACK is located;

if more than one PUCCHs are used for transmitting the HARQ-ACK in a time slot, a length of time slot is determined as a TU in which the PUCCH transmitting the HARQ-ACK is located, and an indication information is received, wherein the indication information is used to indicate to transmit the HARQ-ACK on a specific PUCCH in a time slot in which the HARQ-ACK is transmitted, determined according to a length of time slot length in TU.

In an alternative implementation, the transmitting module 1602 is specifically configured to:

determine a reference point where a PDSCH-to-HARQ-feedback timing value is equal to 0 according to an overlapping between the TU in which the PDSCH is located and the TU in which the PUCCH transmitting the HARQ-ACK is located or according to an overlapping between an OFDM symbol in the time slot in which the PDSCH is actually transmitted and the TU in which the PUCCH transmitting the HARQ-ACK is located;

transmit the HARQ-ACK information according to the reference point and the corresponding HARQ-ACK timing relationship.

In an alternative implementation, the transmitting module 1602 is specifically configured for any of the following conditions:

if the TU in which the PDSCH is located is less than or equal to the TU in which the PUCCH transmitting the HARQ-ACK is located and more than one TU in which the PDSCH is transmitted completely overlaps with one TU in which the PUCCH transmitting the HARQ-ACK is located, determining the TU in which the PUCCH transmitting the HARQ-ACK is located as the reference point where the PDSCH-to-HARQ-feedback timing value is equal to 0;

if the TU in which the PDSCH is transmitted is greater than the TU in which the PUCCH transmitting the HARQ-ACK is located, and more than one TU in which the PUCCH transmitting the HARQ-ACK is located completely overlaps with one TU in which the PDSCH is transmitted, determining one of the more than one TU in which the PUCCH transmitting the HARQ-ACK is located as the reference point where the PDSCH-to-HARQ-feedback timing value is equal to 0;

if the TU in which the PDSCH is transmitted dose not completely overlap with the TU in which the PUCCH transmitting the HARQ-ACK is located, determining one of more than one TU in which the PUCCH transmitting the HARQ-ACK is located which is overlapped with any TU in which the PDSCH is transmitted as the reference point where the PDSCH-to-HARQ-feedback timing value is equal to 0.

In an alternative implementation, the transmitting module 1602 is specifically configured for any one of the followings:

predefining one TU as the reference point where the PDSCH-to-HARQ-feedback timing value is equal to 0;

selecting one TU as the reference point where the PDSCH-to-HARQ-feedback timing value is equal to 0 according to a service requirement.

In an alternative implementation, the transmitting module 1602 is specifically configured for any of the following conditions:

if the service is eMBB service, selecting the last TU of the overlapped TUs in which the HARQ-ACK is transmitted as the reference point where the PDSCH-to-HARQ-feedback timing value is equal to 0;

if the service is URLLC service, selecting one of the overlapped TUs in which the HARQ-ACK is transmitted except the last TU as the reference point where the PDSCH-to-HARQ-feedback timing value is equal to 0;

if the service is URLLC service, selecting the last TU of the overlapped TUs in which the HARQ-ACK is transmitted as the reference point where the PDSCH-to-HARQ-feedback timing value is equal to 0, and determining the value of the HARQ-ACK timing relationship is an arbitrary integer.

In an alternative implementation, the transmitting module 1602 is also configured to determine the service requirement by at least one of the followings:

a scrambled RNTI of the PDCCH scheduling the PDSCH;

DCI of the PDCCH.

In an alternative implementation, the transmitting module 1602 is specifically configured for any one of the following conditions:

if the last OFDM symbol in which the PDSCH is actually transmitted only overlaps with one TU in which the PUCCH transmitting the HARQ-ACK is located, determining the one TU in which the PUCCH transmitting the HARQ-ACK is located as the reference point where the PDSCH-to-HARQ-feedback timing value is equal to 0;

if the last OFDM symbol in which the PDSCH is actually transmitted overlaps with the more than one TU in which the PUCCH transmitting the HARQ-ACK is located, determining the last TU in which the PUCCH transmitting the HARQ-ACK is located as the reference point where the PDSCH-to-HARQ-feedback timing value is equal to 0.

In an alternative implementation, the transmitting module 1602 is specifically configured to multiplex the CSI and HARQ-ACK if a PUCCH transmitting channel state information (CSI) overlaps with at least two PUCCHs transmitting the HARQ-ACK in one time slot by at one of the following manners:

the CSI is multiplexed in the last PUCCH transmitting the HARQ-ACK;

the CSI is multiplexed in the first PUCCH transmitting the HARQ-ACK that satisfies a delay requirement.

In an alternative implementation, the value of the HARQ timing relationship is indicated by a field in a PDCCH scheduling a PDSCH.

In an alternative implementation, when the number of bits of HARQ-ACK is determined semi-statically by the high layer signaling configuration, the PDCCH scheduling PDSCH further includes an HARQ-ACK bit number indication information field, the HARQ-ACK bit number indication information field is used to indicate the number of bits of the HARQ-ACK.

In an alternative implementation, the number of bits indicating the HARQ-ACK is the number of bits of HARQ-ACK generated by one PDSCH; or the number of bits indicating the HARQ-ACK is the number of bits of HARQ-ACK determined according to a set of downlink time slots in which the HARQ-ACK is fed back in any of uplink subframes.

Those skilled in the art can clearly understand that the implementation principle and the technical effects of the apparatus for transmitting the HARQ-ACK information provided by the embodiments of the present application are the same as the foregoing method embodiments, and the device embodiment is convenient and concise for description. For the convenience and brevity of the description, where the apparatus embodiment is not mentioned, reference may be made to the corresponding content in the foregoing method embodiments, and details are not described herein again.

The embodiment of the present application further provides an electronic device (for example, a terminal device), including: a processor and a memory, where the memory stores at least one instruction, at least one program, a code set or an instruction set, the at least one instruction, at least one program, the code set or instruction set is loaded and executed by the processor to implement the corresponding content in the foregoing method embodiments.

Optionally, the electronic device can also include a transceiver. The processor is connected to the transceiver, such as via a bus. It should be noted that, in the actual applications, the transceiver is not limited to one, and the structure of the electronic device does not constitute a limitation on the embodiment of the present application.

Wherein, the processor can be a CPU, a general purpose processor, a DSP, an ASIC, an FPGA or other programmable logic device, a transistor logic device, a hardware component, or any combination thereof. It is possible to implement or execute the various illustrative logical blocks, modules and circuits described in connection with the present disclosure. The processor can also be a combination of computing functions, for example, including one or more microprocessor combinations, a combination of a DSP and a microprocessor, and the like.

The bus can include a path for communicating information between the components described above. The bus can be a PCI bus or an EISA bus. The bus can be divided into an address bus, a data bus, a control bus, and the like. The memory can be ROM or other types of static storage devices that can store static information and instructions, RAM or other types of dynamic storage devices that can store information and instructions, or EEPROM, CD-ROM or other optical disk storage, optical disk storage (including a compressed optical disc, a laser disc, an optical disc, a digital versatile disc, a Blu-ray disc, etc.), magnetic disk storage media or other magnetic storage devices, or any other medium that can be used to carry or store desired program code in the form of an instruction or data structure and that can be accessed by a computer, but is not limited thereto.

The embodiment of the present application further provides a computer readable storage medium for storing computer instructions, which when executed on a computer, enable the computer to execute the corresponding content in the foregoing method embodiments.

The embodiments of the present disclosure are described in detail below, and the examples of the embodiments are illustrated in the figures, wherein throughout the figures, the same or similar reference numbers are used to depict the same or similar elements or elements having the same or similar functions. The embodiments described below with reference to the accompanying figures are illustrative, and are only used to explain the present disclosure, rather than being construed as limiting the present disclosure.

Those skilled in the art should understand that the singular forms "a", "an", "said" and "the" include plural referents unless the context clearly dictates otherwise. It should be further understood that the expression "comprising" or "include" used in the specification of the present disclosure means the existence of the features, integers, steps, operations, elements and/or components, but does not preclude the existence or addition of one or more other features, integers, steps, operations, elements, components and/or combinations thereof. It should be understood that when an element is referred to as being "connected to" or "coupled to" another element, it may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

Those skilled in the art should understand that, unless otherwise defined, all terms used herein (including technical terms and scientific terms) have the same meaning as the general understanding of ordinary technical personnel in the field to which the disclosure belongs. It should also be understood that terms such as those defined in the generic dictionary should be understood to have a meaning consistent with the meaning in the context of the prior art and not to be interpreted in an idealized or overly formal sense unless specifically defined as here.

Those skilled in the art should understand that the "terminal" and "terminal equipment" used herein include a wireless signal receiver device having only a wireless signal transmitting capability and a receiving and transmitting hardware device having a two-way communication capability over a two-way communication link. Such devices may include: a cellular or other communication device with a single line display or a multi-line display or a cellular or other communication device without a multi-line display; Personal Communications Service (PCS), which may combine voice, data processing, fax, and/or data communication capabilities; Personal Digital Assistant (PDA), which may include radio frequency receivers, pagers, Internet/Intranet access, web browsers, notepads, calendars, and/or Global Positioning System (GPS) receiver; and conventional laptop and/or palmtop computer or other device having and/or including a radio frequency receiver. As used herein, "terminal", "terminal equipment" may be portably and transportably installed in a vehicle (aviation, sea and/or land), or adapted and/or configured to operate locally, and/or operate in any other location on the earth and/or space in a distributed form. The "terminal" and "terminal equipment" used herein may also be a communication terminal, an internet terminal, a music/video playing terminal, and may be, for example, a PDA, a Mobile Internet Device (MID), and/or a mobile phone having a music/video playback function, also may be smart TVs, set-top boxes and so on.

In order to better understand the solution provided by the embodiments of the present invention, the problems that may be caused by various changes in the transmission resources in the transmission system of the new air interface are first analyzed. In order to meet the low latency requirement of the Ultra-Reliability Low Latency Communication (URL-LC), the resources scheduled for the PDSCH transmission are limited in the time domain for the URLLC service, and the time domain length of the resource blocks for the PDSCH transmission is no longer necessarily 14 OFDM symbols, and may be a portion of OFDM symbols in one slot. 14 OFDM symbols of one time slot as a PDSCH transmission reference for calculating CSI, the computed CSI would be not accurate, thereby affecting performance. Therefore, when calculating the CSI, it is assumed that the total resources used for the PDSCH transmission need to be reconsidered. In addition, for different subcarrier space configurations, the lengths of slots are different, so the number of OFDM symbols occupied by scheduling the PDSCH of the URLLC will also be different.

Based on this, in the present disclosure, the occupancy status of the foregoing transmission resource is reconsidered, so that the number of OFDM symbols used for the PDSCH transmission can be relatively accurately determined when calculating the CSI, and the number pf OFDM symbols assumed for the PDSCH transmission matches with the number of OFDM symbols actually used for the PDSCH transmission of the URLLC when calculating the CSI, so as to more accurately compute the CSI. In this way, the performance of the PDSCH can be guaranteed, the resources can be saved as much as possible, and the performance of the URLLC service can be better satisfied.

The technical solutions of the present disclosure and how to solve the above technical problems are described in detail in the following specific embodiments. The following specific embodiments may be combined with each other, and the same or similar concepts or processes may not be repeated in some embodiments. The embodiments of the present disclosure will be described below with reference to the accompanying figures.

Figure 19:
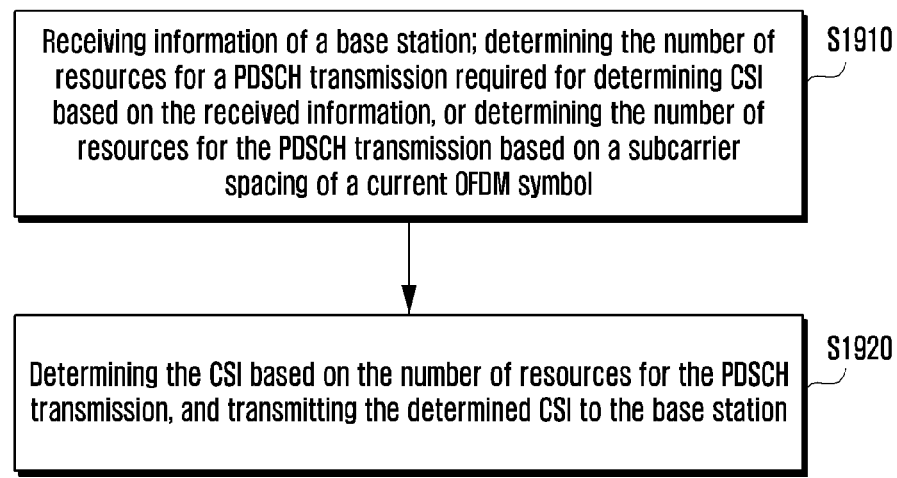
FIG. 19 illustrates a schematic flowchart diagram of a method for reporting channel state information according to an embodiment of the present disclosure.

FIG. 19 is a schematic flowchart diagram of a method for reporting channel state information according to an embodiment of the present disclosure. As shown in FIG. 19, the method may include the following steps.

Step S1910: receiving information of a base station, determining the number of resources for PDSCH transmission required for determining CSI according to the received information, or determining the number of resources for PDSCH transmission based on a subcarrier spacing of a current OFDM symbol.

Step S1920: determining the CSI based on the number of resources for the PDSCH transmission, and transmitting the determined CSI to the base station.

The method for reporting channel state information provided by the embodiment of the present disclosure may be performed by a terminal equipment, i.e. a User Equipment, and after the CSI is determined, the UE reports the CSI to the base station.

It can be seen from the contents of step S1910 that the received information of the base station includes information for determining the number of resources for the PDSCH transmission required for determining the CSI, wherein the number of resources for the PDSCH transmission required for determining the CSI refers to the total number of resources occupied by the time domain transmission block in which the PDSCH is located when calculating the CSI, and may specifically be the number of all OFDM symbols used for the PDSCH transmission. The total number of resources occupied by the time domain transmission block may be, for example, the number of time domain resources within a time slot, or within a small time slot, or within a plurality of time slots, or a portion of one time slot.

Particularly, since the calculation of the CSI is performed by using the corresponding time domain transmission block, the total number of resources occupied by the time domain transmission block in which the PDSCH is located when calculating the CSI corresponds to the total number of OFDM symbols in the time domain resources occupied by a time domain transmission block (for example, a subframe or a time slot, or a plurality of time slots, or a portion of one time slot, etc.), that is, corresponds to the total number of OFDM symbols in the time domain resources occupied by the time domain transmission block.

It should be noted that, in the embodiment of the present disclosure, the CSI includes at least all information in the current wireless communication transmission system CSI, such as a rank indication (RI), a precoding matrix indicator (PMI), and/or a channel quality indicator (CQI), etc., and the CSI may also include other channel state information added as needed.

According to the method for reporting channel state information provided by the embodiment of the present disclosure may include: when determining the CSI, firstly determining the assumed number of resources for the PDSCH transmission, and then determining the CSI based on the determined assumed number of resources for the PDSCH transmission. Based on the method, the CSI can be determined more accurately, so that the transmission performance of the PDSCH can be better ensured. In the prior art, the computed CSI is inaccurate due to the change of the transmission resource in the new radio (NR) transmission system, thereby the transmission performance of the PDSCH is affected, and the transmission resources are wasted. The solution of the embodiment of the present disclosure can solve the above problems.

According to an alternative embodiment of the present disclosure, in the foregoing step S1920, the determining the CSI based on the number of resources for the PDSCH transmission includes:
  determining a CSI configuration relationship corresponding to the number of resources for the PDSCH transmission; and
  determining the CSI corresponding to the number of resources for the PDSCH transmission based on the CSI configuration relationship corresponding to the number of resources for the PDSCH transmission.

As an alternative, in a practical application, it may configure a CSI configuration relationship corresponding to each possible number of resources based on the possible number of resources for the PDSCH transmission, and determine the number of resources for the PDSCH transmission, then determine the corresponding CSI based on the CSI configuration relationship corresponding to the determined number of the resources.

In an alternative embodiment of the present disclosure, the CSI configuration relationship is a mapping relationship between a signal-to-noise ratio (SNR) and a CSI, and the determining the CSI corresponding to the number of resources for the PDSCH transmission based on the CSI configuration relationship corresponding to the number of resources for the PDSCH transmission may include:
  determining the current signal-to-noise ratio; and
  determining the CSI corresponding to the current signal-to-noise ratio based on the current signal-to-noise ratio and a mapping relationship between a signal-to-noise ratio and a CSI corresponding to the number of resources for the PDSCH transmission, wherein the CSI corresponding to the current signal-to-noise ratio is the CSI corresponding to the number of resources for the PDSCH transmission.

In practical applications, even if the number of resources for the PDSCH transmission are equal to each other, the corresponding CSIs are usually different in the case of different signal-to-noise ratios (SNR). Therefore, in order to better ensure the transmission performance of the PDSCH, the CSI configuration relationship may specifically be the mapping relationship between the signal-to-noise ratio and the CSI, that is, the CSI configuration relationship corresponding to each resource number includes the mapping relationship between different signal-to-noise ratios and CSI corresponding to the resource number. After determining the number M of resources for the PDSCH transmission, the mapping relationship between the signal-to-noise ratio and the CSI corresponding to the resource number M may be determined, and further based on the current signal-to-noise ratio, it may find out the CSI corresponding to the current signal-to-noise ratio in the determined mapping relationship between the signal-to-noise ratio and the CSI.

In an alternative embodiment of the present disclosure, the determining the CSI configuration relationship corresponding to the number of resources for the PDSCH transmission may include:
  determining the CSI configuration relationship corresponding to the number of resources for the PDSCH transmission based on the subcarrier spacing of the current OFDM symbol, wherein the CSI configuration relationships corresponding to the at least two subcarrier spacings are different.

That is, when there are CSI configuration relationships corresponding to at least two subcarrier spacings, the CSI configuration relationship corresponding to the number of resources for the PDSCH transmission refers to the CSI configuration relationship corresponding to the subcarrier spacing of the current OFDM symbol and the number of resources for the PDSCH transmission.

In an alternative embodiment of the present disclosure, in the foregoing step S1910, the received information of the base station includes at least one of a high layer signaling and a physical layer signaling.

In an alternative embodiment of the present disclosure, in step S1910, the determining the number of resources for the PDSCH transmission may include:
if the information is received, determining the number of resources for the PDSCH transmission based on the information; if the information is not received, determining the number of resources for the PDSCH transmission based on the subcarrier spacing of the current OFDM symbol.

Specifically, in an alternative solution of the present disclosure, the determining the number of resources for the PDSCH transmission required for determining the CSI specifically includes at least one of the following modes:
mode 1: determining a preset resource number as the number of resources for the PDSCH transmission;
mode 2: determining the number of resources for the PDSCH transmission based on the subcarrier spacing of the current OFDM symbol;
mode 3: determining the number of resources for the PDSCH transmission based on the received higher layer signaling;
mode 4: determining the number of resources for the PDSCH transmission based on the received physical layer signaling;
mode 5: determining the number of resources for the PDSCH transmission based on the high layer signaling or the physical layer signaling, if the high layer signaling or the physical layer signaling is received; determining the preset number of resources in advance as the number of resources for the PDSCH transmission or determining the number of resources for the PDSCH transmission based on the subcarrier spacing of the current OFDM symbol, if neither the high layer signaling nor the physical layer signaling is received.

In order to better understand the solution of the embodiment of the present disclosure, the above modes 1-5 are further described as follows.

Mode 1

The total number M of OFDM symbols (M is a positive integer) in the time domain transmission block may be determined by a UE based on a preset, and the preset may be specified in a protocol form, for example, if the total number M of OFDM symbols in the time domain transmission block specified in the protocol is 14 or 7, the number of resources for the PDSCH transmission determined by the UE is the total number of OFDM symbols in the time domain transmission block specified in the protocol.

Mode 2

In the alternative embodiment of the present disclosure, the determining the number of resources for the PDSCH transmission based on the subcarrier spacing of the current OFDM symbol includes:
determining the number of resources for the PDSCH transmission based on the subcarrier spacing of the current OFDM symbol and a preset mapping relationship between the subcarrier spacing and the number of resources.

As can be seen from the foregoing description, the lengths of slots are different for different subcarrier space configurations (i.e. different subcarrier spacings of OFDM symbols). Therefore, the total number of OFDM symbols in the time domain transmission block are different, that is, the number of resources for the PDSCH transmission are different. Therefore, the number of resources for the PDSCH transmission can be determined based on the subcarrier spacing of the current actual OFDM symbol.

Specifically, in the practical applications, it may preset the mapping relationship between different subcarrier space configurations and the total number of OFDM symbols in the corresponding time domain transmission block, i.e., the mapping relationship between the subcarrier spacing and the number of resources for the PDSCH transmission, so that the number of resources for the PDSCH transmission can be obtained based on the subcarrier spacing of the current actual OFDM symbol and the mapping relationship.

As an example, a mapping relationship between the total number of OFDM symbols data M and subcarrier space μm the time domain transmission block is shown in Table 3.

TABLE 3

| subcarrier space ($\mu$) | the total number of OFDM symbols in the time domain transmission block (M) |
| --- | --- |
| 0 | 7 |
| 1 | 7 |
| 2 | 14 |
| 3 | 14 |

Wherein, in this example, the subcarrier space $\mu$ shown in Table 3 is used to represent the subcarrier space configuration, and different values of $\mu$ correspond to different subcarrier spacings. For example, when $\mu$ is 0, the subcarrier spacing is 15 KHz (kilohertz), the total number of OFDM symbols in the corresponding time domain transmission block is 7, and for example when the value of $\mu$ is 1, the subcarrier spacing is 30 KHz, while the total number of OFDM symbols in the corresponding time domain transmission block is 7. Through the mapping relationship, it may determine the number of resources for the PDSCH transmission based on the current subcarrier spacing of the OFDM symbol. For example, the subcarrier spacing of the current actual OFDM symbol is 60 KHz, through the mapping relationship shown in Table 3, based on the subcarrier space configuration of the subcarrier spacing being 60 kHz, i.e., the $\mu$ value being 2, it may determine that the number of resources for the PDSCH transmission is 14 OFDM symbols. It should be noted that the mapping relationship shown in Table 3 is only an example of the above mapping relationship. In the practical applications, it may implement different configurations and adjustments based on actual requirements. The corresponding relationship between the subcarrier spacing and the resource number in the mapping relationship may be preset by a protocol, or determined by the UE based on the received high layer signaling or physical layer signaling.

Mode 3

In an alternative embodiment of the present disclosure, the number of resources for the PDSCH transmission determined based on the high layer signaling is one resource number in a preset resource number set.

In an alternative embodiment of the present disclosure, when the number of resources for the PDSCH transmission determined based on the high layer signaling is one resource number with the preset resource number set, in the foregoing step S1920, the determining the CSI based on the number of resources for the PDSCH transmission may include:

determining a CSI configuration relationship corresponding to the number of resources for the PDSCH transmission; and
  determining the CSI corresponding to the number of resources for the PDSCH transmission based on the CSI configuration relationship corresponding to the number of resources for the PDSCH transmission.

In this mode, the UE may determine the total number M of OFDM symbols in the time domain transmission block based on the received high layer signaling, that is, the high layer signaling carries the resource number indication information used to determine the number of resources for the PDSCH transmission. For example, the UE determines that the total number of OFDM symbols in the time domain transmission block is M by receiving the high layer signaling configuration, for example, M may be equal to 7 or 14, and so on. The high layer signaling configuration may be the number in a set (i.e., the set of foregoing resource numbers), for example, one set is {2, 4, 7}, and the high layer signaling may be configured the number 4 in the set as the number of OFDM symbols assumed to calculation the CSI, that is, the high layer signaling indicates that the number of resources for the PDSCH transmission is 4 in the resource number set {2, 4, 7}.

It should be noted that, in the practical application, the resource number indication information in the high-layer signaling may be explicit indication information or implicit indication information. For example, in the above example, after the high layer signaling is parsed, it may obtain that the number of resources for the PDSCH transmission is 4, and it also may be information for representing the number of resources being 4.

The use may reserve (i.e., pre-store) a performance table of simulating the PDSCH based on the assumed the number of OFDM symbols for the number of OFDM symbols in a set of resource numbers. Therefore, it may reduce the stored performance table of simulating the PDSCH by determining a set to constrain the possible number of OFDM symbols. In the mode 3, the UE may configure a plurality of CSI report configurations (i.e., the above CSI configuration relationship), and add a configuration of the number of OFDM symbols for calculating the CSI (i.e., a set of resource numbers) in the configuration of each CSI report, and may configure respectively corresponding CSI configuration relationship for each resource number in the set based on the simulation result, according to the possible resource numbers in the set of resource numbers (i.e., the number of OFDM symbols). After the number of resources for the PDSCH transmission is determined based on the high layer signaling, it may determine the corresponding CSI based on the CSI configuration relationship corresponding to the determined number of resources.

Of course, in the practical application, if the high layer signaling is not received, the number of resources for the PDSCH transmission may be determined in the foregoing mode 1 or mode 2. For example, by using the foregoing mode 1, the number of OFDM symbol used for calculating the CSI may be a protocol preset value, for example, 14.

In an alternative embodiment of the present disclosure, the CSI configuration relationship is a mapping relationship between a signal-to-noise ratio and a CSI, and the determining the CSI corresponding to the number of resources for the PDSCH transmission based on the CSI configuration relationship corresponding to the number of resources for the PDSCH transmission includes:

determining the current signal-to-noise ratio; and
  determining the CSI corresponding to the current signal-to-noise ratio based on the current signal-to-noise ratio and a mapping relationship between a signal-to-noise ratio and a CSI corresponding to the number of resources for the PDSCH transmission, wherein the CSI corresponding to the current signal-to-noise ratio is the CSI corresponding to the number of resources for the PDSCH transmission.

As can be seen from the foregoing description, in the practical applications, even if the number of resources for the PDSCH transmission are equal to each other, the corresponding CSIs are usually different in the case of different signal to noise ratios (SNR). Therefore, in order to better ensure the transmission performance of the PDSCH, the CSI configuration relationship may specifically be the mapping relationship between the signal to noise ratio and the CSI, that is, the CSI configuration relationship corresponding to each resource number includes the mapping relationship between different signal to noise ratios and CSI corresponding to the resource number. After determining the number M of resources for the PDSCH transmission, the mapping relationship between the signal-to-noise ratio and the CSI corresponding to the resource number M may be determined, and further based on the current signal-to-noise ratio, it may find out the CSI corresponding to the current signal-to-noise ratio in the determined mapping relationship between the signal-to-noise ratio and the CSI.

In an alternative embodiment of the present disclosure, the CSI configuration relationships corresponding to the at least two subcarrier spacings are different, and the determining the CSI configuration relationship corresponding to the number of resources for the PDSCH transmission may include:

determining the CSI configuration relationship corresponding to the number of resources for the PDSCH transmission based on the subcarrier spacing of the current OFDM symbol.

Since the lengths of slots are different when the space configurations of different subcarriers are different, the sets of OFDM symbols may be different in different subcarrier space configurations. For example, when the subcarrier space is 15 kHz, the resource number set may be {2, 4, 7}; and when the subcarrier space is 30 kHz, the resource number set may be {4, 7, 10}. Correspondingly, the above CSI configuration relationship may include CSI configuration relationships respectively corresponding to each of the resource numbers in the resource number sets that correspond to different subcarrier spacings. After the number M of resources for the PDSCH transmission is determined, it is necessary to determine a corresponding CSI configuration relationship based on the subcarrier spacing of the current OFDM symbol and the resource number M, that is, the two parameters of the subcarrier spacing and the resource number together determine a CSI configuration relationship.

As an example, a configuration mode of a resource number set corresponding to different subcarrier spacings (i.e., different subcarrier space configurations) is shown in Table 4.

TABLE 4

| subcarrier space (μ) | the number M of OFDM symbols in configuration 1 | the number M of OFDM symbols in configuration 2 | the number M of OFDM symbols in configuration 3 |
| --- | --- | --- | --- |
| 0 | 2 | 4 | 7 |
| 1 | 4 | 7 | 10 |
| 2 | 7 | 10 | 14 |
| 3 | 7 | 10 | 14 |

As shown in Table 4, the subcarrier space μ is used to characterize the subcarrier space configuration, and the different values of μ correspond to different subcarrier spacings. Specifically, when μ is 0, 1, 2, or 3, the subcarrier spacings may correspond to 15 kHz, 30 KHz, 60 KHz, or 120 KHz, respectively. When the subcarrier spacing is 15 kHz, the resource number set may be {2, 4, 7}; when the subcarrier spacing is 30 kHz, the resource number set may be {4, 7, 10}; and when the subcarrier spacing is 60 KHz and 120 KHz, the resource number set may be {7, 10, 14}. For the resource number sets corresponding to the different subcarrier spacings shown in Table 4, it may respectively configure the CSI configuration relationships corresponding to each resource number in the resource number sets that correspond to each kind of subcarrier spacing. As an example, it is assumed that the number M of resources for the PDSCH transmission determined based on the high layer signaling is 4, and if the current subcarrier spacing is 15 kHz, the CSI configuration relationship at this time corresponds to the CSI configuration relationship in the case of the value of μ being 0 and the number of resources being 4; if the current subcarrier spacing is 30 kHz, the CSI configuration relationship at this time corresponds to the CSI configuration relationship in the case of the value of μ being 1 and the number of resources being 4.

Mode 4

The total number M of OFDM symbols in the time domain transmission block may be determined based on the physical layer signaling received by the UE. Specifically, the UE may determine through receiving the physical layer signaling that the total number of OFDM symbols in the indicated time domain transmission block is M. The total number of OFDM symbols in the time domain transmission block for a periodic CSI or an aperiodic CSI may be determined based on the physical layer signaling indication.

In an alternative embodiment of the present disclosure, the determining the number of resources for the PDSCH transmission based on the physical layer signaling includes:
determining the number of resources corresponding to the value of the information bit in the physical layer signaling based on the value of the information bit in the physical layer signaling and a mapping relationship between the preset bit value and the number of resources, the number of resources corresponding to the value of the information bit in the physical layer signaling is the number of resources for the PDSCH transmission.

Specifically, the resource number indication information in the physical layer signaling may be N bits in the physical layer signaling (N is a positive integer, which is determined by a protocol or configured by the high layer signaling, such as N is equal to 1), that is, N bits are used for indicating the total number M of OFDM symbols in the time domain transmission block, and the different bit indication information (i.e., the different value of information bit) corresponds to a different number M of OFDM symbols. After obtaining the N bits based on the received physical layer signaling, the UE may find out the resource number corresponding to the value of the N bits in the mapping relationship between the preconfigured information bit and the resource number based on the value of the N bits. The found resource number is the total number M of OFDM symbols in the time domain transmission block, that is, the number of resources for the PDSCH transmission.

As an example, a mapping relationship between the total number M of OFDM symbols and the indication information of N bits in the time domain transmission block is shown in Table 5. As shown in Table 5, when the information bit in the physical layer signaling takes a value of 0, the number of resources for the PDSCH transmission is 7 OFDM symbols, and when the information bit in the physical layer signaling takes a value of 1, the number of resources for the PDSCH transmission is 14 OFDM symbols.

TABLE 5

| bit value | the total number of OFDM symbols in the time domain transmission block (M) |
| --- | --- |
| 0 | 7 |
| 1 | 14 |

In an alternative embodiment of the present disclosure, the foregoing physical layer signaling used to indicate the number of resources for the PDSCH transmission may be a physical layer signaling used to indicate a CSI report. In the existing physical layer signaling, it needs to include information indicating a CSI report (CQI Request), and the information is located in the DCI. For the aperiodic CSI or semi-persistent CSI, when the physical layer signaling indicates the total number of OFDM symbols in the time domain transmission block as M, it may be combined with the information indicating the CSI report, that is, the physical layer signaling for indicating the CSI report may carry the foregoing resource number indication information.

In an alternative embodiment of the present disclosure, the information bit in the physical layer signaling is an information bit for indicating the CSI report in the physical layer signaling, or an information bit specified in the physical layer signaling.

The present solution gives two modes of indicating the number of resources for the PDSCH transmission through the physical layer signaling for indicating the CSI report: 1) the information bit indicates the CSI report while indicating the total number M of OFDM symbols in the time domain transmission block of the aperiodic CSI or the semi-persistent CSI, that is, the indication information indicates the CSI report together with the value of M, for example, the CSI report and the value of M can be together indicated by the 2-bit information; 2) in the DCI of the information indicating the CSI report, it may indicate the total number M of OFDM symbols in the time domain transmission block of the aperiodic CSI by using set bit indication, that is, in the DCI, it may use different bit information to respectively indicate the CSI report and the value of M.

Based on the solution, it may determine the number of resources for the PDSCH transmission based on the value of the information bit in the received physical layer signaling for indicating the CSI report. As an example, a mapping relationship between the bit values and resource numbers when determining the number of resources for the PDSCH transmission based on the value of information bit in the physical layer signaling for indicating a CSI report is shown in Table 6. As shown in Table 6, in this example, the total number M of OFDM symbols in the time domain transmission block is indicated by 2 bit information, for example, when the value of the information bit in the physical layer signaling is 00, the total number M of OFDM symbols in the time domain transmission block is 7.

TABLE 6

| bit value | the total number of OFDM symbols in the time domain transmission block (M) |
| --- | --- |
| 00 | 7 |
| 01 | 14 |

Mode 5

For the total number M of OFDM symbols in the time domain transmission block, if the UE has received a high layer signaling configuration or a physical layer signaling indication that indicates the total number M of OFDM symbols, the UE determines the total number M of OFDM symbols in the time domain transmission block based on the received high layer signaling configuration or the physical layer signaling indication when calculating the CSI, and calculates the CSI based on the determined number of OFDM symbols; if the UE has receive neither the high layer signaling configuration indicating the total number M of OFDM symbols nor the physical layer signaling indication indicating the total number M of OFDM symbols, the UE may determine the total number M of OFDM symbols in the time domain transmission block based on the processing of mode 1 or mode 2 in this embodiment when calculating the CSI, and use it to compute the CSI.

According to the method for reporting channel state information in the embodiment of the present disclosure, the number of resources for the PDSCH transmission can be determined be determined more accurately when calculating the CSI, thereby ensuring the transmission performance of the PDSCH.

Figure 20:
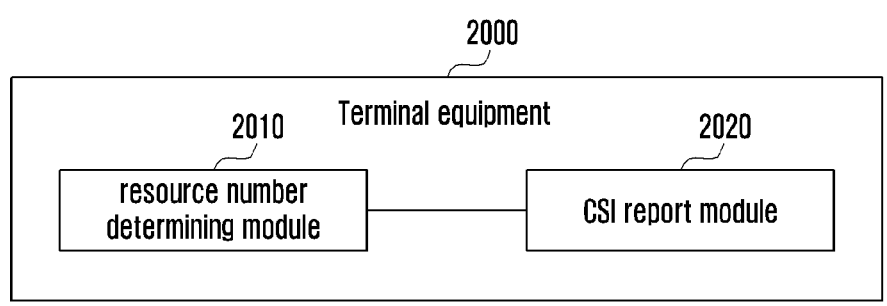
FIG. 20 illustrates a schematic structural diagram of a terminal equipment according to an embodiment of the present disclosure.

Based on the same principle as the method for reporting channel state information provided by the embodiment of the present disclosure, the embodiment of the present disclosure further provides another terminal equipment. As shown in FIG. 20, the terminal equipment 2000 may include a resource number determining module 2010 and a CSI report module 2020.

The resource number determining module 2010 is configured to receive information of a base station, and determine the number of resources for a physical downlink shared channel (PDSCH) transmission required for determining channel state information (CSI) according to the received information; or determine the number of resources for the PDSCH transmission based on a subcarrier spacing of a current orthogonal frequency division multiplexing (OFDM) symbol.

The CSI report module 2020 is configured to determine the CSI based on the number of resources for the PDSCH transmission, and transmit the determined CSI to the base station.

As can be seen from the foregoing description, the received information of the base station includes information for determining the number of resources for the PDSCH transmission, that is, for determining the number of resources for the PDSCH transmission when determining the CSI.

It can be understood that the terminal equipment in the embodiment of the present disclosure may be an execution body of the method shown in FIG. 19 and its alternative embodiment, and each module of the terminal equipment may have a function of implementing corresponding steps in the method. This function can be implemented in hardware or in software executed by the hardware. Each of the above modules may be software and/or hardware, and each module may be implemented separately or multiple modules may be integrated. The description of the functions of the modules of the terminal equipment and other functions may refer to the corresponding descriptions in the foregoing methods, and the details will not be repeated herein.

Optionally, the received information of the base station includes at least one of a high layer signaling and a physical layer signaling.

Optionally, when determining the number of resources for the PDSCH transmission, the resource number determining module 2010 is specifically configured to:

if the information is received, determine the number of resources for the PDSCH transmission based on the information; if the information is not received, determine the number of resources for the PDSCH transmission based on the subcarrier spacing of the current OFDM symbol.

Optionally, when determining the number of resources for the PDSCH transmission based on the subcarrier spacing of the current orthogonal frequency division multiplexing (OFDM) symbol, the resource number determining module 2010 is specifically configured to:

determine the number of resources for the PDSCH transmission based on the subcarrier spacing of the current OFDM symbol and a preset mapping relationship between the subcarrier spacing and the number of resources.

Optionally, the number of resources for the PDSCH transmission determined based on the high layer signaling is one resource number in the preset resource number set.

Optionally, when determining the CSI based on the number of resources for the PDSCH transmission, the CSI report module 2020 is specifically configured to:

determine a CSI configuration relationship corresponding to the number of resources for the PDSCH transmission; and determine the CSI corresponding to the number of resources for the PDSCH transmission based on the CSI configuration relationship corresponding to the number of resources for the PDSCH transmission.

Optionally, the CSI configuration relationship is a mapping relationship between a signal-to-noise ratio and a CSI, and when determining the CSI corresponding to the number of resources for the PDSCH transmission based on the CSI configuration relationship corresponding to the number of resources for the PDSCH transmission, the CSI report module 2020 is specifically configured to:

determine the current signal-to-noise ratio; and determine a CSI corresponding to the current signal-to-noise ratio based on the current signal-to-noise ratio and a mapping relationship between a signal-to-noise ratio and a CSI corresponding to the number of resources for the PDSCH transmission, the CSI corresponding to the current signal-to-noise ratio is the CSI corresponding to the number of resources for the PDSCH transmission.

Optionally, when determining the CSI configuration relationship corresponding to the number of resources for the PDSCH transmission, the CSI report module 2020 is specifically configured to:

determine the CSI configuration relationship corresponding to the number of resources for the PDSCH transmission based on the subcarrier spacing of the current OFDM symbol, wherein the CSI configuration relationships corresponding to the at least two subcarrier spacings are different.

Optionally, when determining the number of resources for the PDSCH transmission based on the physical layer signaling, the resource number determining module 2010 is specifically configured to:

determine the number of resources corresponding to the value of the information bit in the physical layer signaling based on the value of the information bit in the physical layer signaling and a mapping relationship between the preset bit value and the number of resources, the number of resources corresponding to the value of the information bit in the physical layer signaling is the number of resources for the PDSCH transmission.

Optionally, for a aperiodic CSI report or a semi-persistent CSI report, the physical layer signaling is a physical layer signaling for indicating a CSI report.

Optionally, the information bit in the physical layer signaling is information bit for indicating the CSI report in the physical layer signaling or information bit specified in the physical layer signaling.

Based on the same principle as the method shown in FIG. 19, the embodiment of the present disclosure further provides a method for reporting channel state information, and the method may include:

transmitting information to a terminal equipment; receiving channel state information (CSI) transmitted by the terminal equipment, wherein the CSI is determined by the terminal equipment based on the number of resources for PDSCH transmission that is determined based on the information; or receiving the CSI transmitted by the terminal equipment, wherein the CSI is determined based on the number of resources for the PDSCH transmission that is determined based on a subcarrier spacing of a current orthogonal frequency division multiplexing (OFDM) symbol.

As can be seen from the foregoing description, the information transmitted to the terminal equipment, that is, the information transmitted by the base station transmitting information to the terminal equipment, includes information for determining the number of resources for the PDSCH transmission required for determining CSI, and after receiving the information, the terminal equipment determines the number of resources for the PDSCH transmission required for determining the CSI according to the received information.

Optionally, the information transmitted to the terminal equipment is at least one of the high layer signaling and the physical layer signaling.

Optionally, the number of resources for the PDSCH transmission determined by the terminal equipment based on the subcarrier spacing of the current OFDM symbol is the number of resources for the PDSCH transmission determined based on the subcarrier spacing of the current OFDM symbol and a mapping relationship between the preset subcarrier spacing and the resource number.

Optionally, the number of resources for the PDSCH transmission determined by the terminal equipment based on the high layer signaling is one resource number of the preset resource number set.

Optionally, the determining, by the terminal equipment, the CSI based on the number of resources for the PDSCH transmission includes:

determining a CSI configuration relationship corresponding to the number of resources for the PDSCH transmission; and determining the CSI corresponding to the number of resources for the PDSCH transmission based on the CSI configuration relationship corresponding to the number of resources for the PDSCH transmission.

Optionally, the CSI configuration relationship is a mapping relationship between a signal-to-noise ratio and a CSI, and the determining, by the terminal equipment, the CSI corresponding to the number of resources for the PDSCH transmission based on the CSI configuration relationship corresponding to the number of resources for the PDSCH transmission includes:

determining the current signal-to-noise ratio; and determining the CSI corresponding to the current signal-to-noise ratio based on the current signal-to-noise ratio and a mapping relationship between a signal-to-noise ratio and a CSI corresponding to the number of resources for the PDSCH transmission, wherein the CSI corresponding to the current signal-to-noise ratio is the CSI corresponding to the number of resources for the PDSCH transmission.

Optionally, the determining, by the terminal equipment, the CSI configuration relationship corresponding to the number of resources for the PDSCH transmission includes:

determining the CSI configuration relationship corresponding to the number of resources for the PDSCH transmission based on the subcarrier spacing of the current OFDM symbol, wherein the CSI configuration relationships corresponding to the at least two subcarrier spacings are different.

Optionally, the determining, by the terminal equipment, the number of resources for the PDSCH transmission based on the physical layer signaling includes:

determining the number of resources corresponding to the value of the information bit in the physical layer signaling based on the value of the information bit in the physical layer signaling and a mapping relationship between the preset bit value and the number of resources, the number of resources corresponding to the value of the information bit in the physical layer signaling is the number of resources for the PDSCH transmission.

Optionally, for an aperiodic CSI report or a semi-persistent CSI report, the physical layer signaling is a physical layer signaling for indicating a CSI report.

Optionally, the information bit in the physical layer signaling is an information bit for indicating the CSI report in the physical layer signaling or an information bit specified in the physical layer signaling.

Based on the same principle, the embodiment of the present disclosure further provides a base station, the base station includes:

a channel state information (CSI) receiving module configured to transmit information to a terminal equipment and receive a CSI transmitted by the terminal equipment, wherein the information includes information for determining the number of resources used for PDSCH transmission when the CSI is determined, and the CSI is determined by the terminal equipment based on the number of resources for PDSCH transmission that is determined based on the information; or receive the CSI transmitted by the terminal equipment, wherein the CSI is determined based on the number of resources for the PDSCH transmission that is determined based on a subcarrier spacing of a current orthogonal frequency division multiplexing (OFDM) symbol.

It can be understood that the base station in the embodiment of the present disclosure may be an execution body of the method for reporting the corresponding channel state information provided by the embodiment of the present disclosure and its alternative embodiment, and the base station may have a function of implementing corresponding steps in the method. The description of the functions of the base station and other functions may refer to the corresponding descriptions in the foregoing methods, and the details are not repeated herein.

Based on the same principle, the embodiment of the present disclosure further provides an electronic equipment, the electronic equipment includes: a memory configured to store computer instructions; and a processor configured to execute the computer instructions to perform the method of any embodiment of the present disclosure.

Based on the same principle, the embodiment of the present disclosure further provides a computer-readable storage medium, the storage medium stores a computer program that, when executed by a processor, implements the method of any embodiment of the present disclosure.

Figure 21:
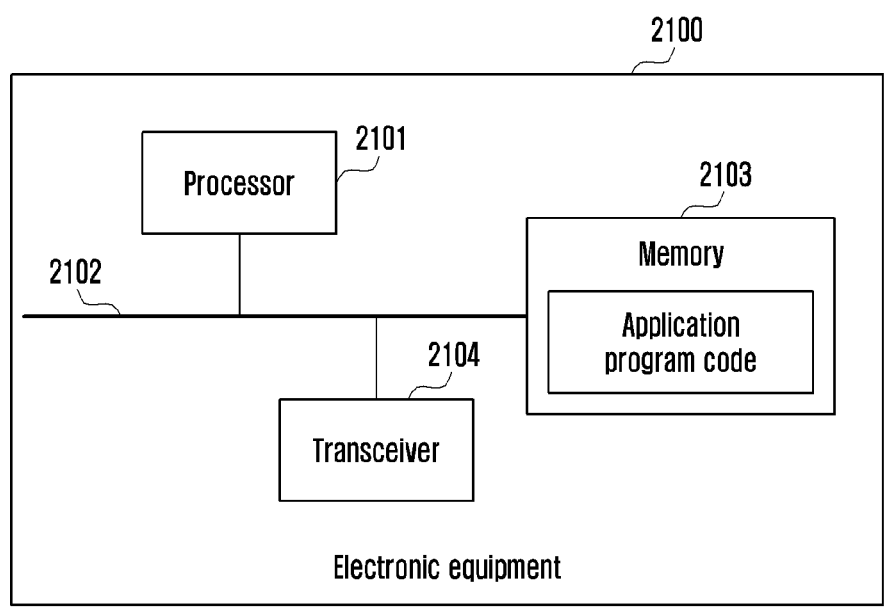
FIG. 21 illustrates a schematic structural diagram of an electronic equipment according to an embodiment of the present disclosure.

FIG. 21 is a schematic structural diagram of an electronic equipment to which the embodiment of the present disclosure is applied. As shown in FIG. 21, an electronic equipment 2100 may mainly include a processor 2101 and a memory 2103. The processor 2101 is connected to the memory 2103 through, for example, the bus 2102. Optionally, the electronic equipment 2100 may further include a transceiver 2104. It should be noted that, in the practical application, the transceiver 2004 is not limited to one, and the structure of the electronic equipment 2100 does not constitute a limitation on the embodiments of the present disclosure.

The processor 2101 may be a central processing unit (CPU), a general-purpose processor, a digital signal processor (DSP), an application specific integrated circuit (ASIC), and an field programmable gate array (FPGA), or other programmable logic device, transistor logic device, hardware component, or any combination thereof. It is possible to implement or execute the various exemplary logical blocks, modules and circuits described in combination with the disclosures of the present disclosure. The processor 2101 may also be a combination of computing functions, such as a combination of one or more microprocessor, a combination of a DSP and a microprocessor, and so on.

The bus 2102 may include a path for communicating information between the above components. The bus 2102 may be a peripheral component interconnect (PCI) bus or an extended industry standard architecture (EISA) bus. The bus 2102 may be divided into an address bus, a data bus, a control bus, and so on. For the sake of presentation, FIG. 5 only uses one thick line to represent the bus, but it does not mean that there is only one bus or one type of bus.

The memory 2103 may be a read only memory (ROM) or other type of static storage device that can store static information and instructions, random access memory (RAM) or other types of dynamic storage device that can store information and instructions, also may be electrically erasable programmable read only memory (EEPROM), compact disc read only memory (CD-ROM) or other optical disc storage, optical disc storage (including compression optical discs, laser discs, optical discs, digital versatile discs, Blu-ray discs, etc.), magnetic disk storage media or other magnetic storage devices, or any other medium that can be used to carry or store desired program code in the form of instructions or data structures and can be accessed by a computer, but not limited to this.

The memory 2103 is used to store application program code that, when executed by the processor 2101, implements the solution of the present disclosure. The processor 2101 is configured to execute application program code stored in the memory 2103 to implement the content shown in any of the foregoing method embodiments.

In an embodiment of the present disclosure, a method for transmitting hybrid automatic retransmission request acknowledgement (HARQ-ACK) information, comprises, determining, by a terminal, a time unit (TU) in which a physical uplink control channel (PUCCH) transmitting the HARQ-ACK is located according to a length of a time slot in which the PUCCH transmitting the HARQ-ACK is located and the number of PUCCHs in the time slot; and transmitting, by the terminal, the HARQ-ACK information based on the determined TU in which the PUCCH transmitting the HARQ-ACK is located and a corresponding HARQ timing relationship.

Wherein, the determining the one of the more than one TU in which the PUCCH transmitting the HARQ-ACK is located as the reference point where the PDSCH-to-HARQ-feedback timing value is equal to 0, may include any one of the followings: predefining one TU as the reference point where the PDSCH-to-HARQ-feedback timing value is equal to 0; and selecting one TU as the reference point where the PDSCH-to-HARQ-feedback timing value is equal to 0 according to a service requirement.

Wherein the selecting the one TU as the reference point where the PDSCH-to-HARQ-feedback timing value is equal to 0 according to the service requirement, may include any of the following conditions: when a service is Enhanced mobile broadband (eMBB) service, selecting a last TU of the overlapped TUs in which the HARQ-ACK is transmitted as the reference point where the PDSCH-to-HARQ-feedback timing value is equal to 0; when the service is Low-latency high-reliability (URLLC) service, selecting one of the overlapped TUs in which the HARQ-ACK is transmitted except the last TU as the reference point where the PDSCH-to-HARQ-feedback timing value is equal to 0; and when the service is URLLC service, selecting the last TU of the overlapped TUs in which the HARQ-ACK is transmitted as the reference point where the PDSCH-to-HARQ-feedback timing value is equal to 0, and determining a value of the HARQ timing relationship is an arbitrary integer.

Wherein before the selecting the one TU as the reference point where the PDSCH-to-HARQ-feedback timing value is equal to 0 according to the service requirement, may further include: determining the service requirement by at least one of the followings: a scrambled Radio Network Temporary Identifier (RNTI) of a Physical Downlink Control Channel (PDCCH) scheduling the PDSCH; and downlink control information (DCI) of the PDCCH.

Wherein the value of the HARQ timing relationship may be indicated by a field in the PDCCH scheduling the PDSCH.

When the number of bits of HARQ-ACK may be determined semi-statically by a high layer signaling configuration, the PDCCH scheduling PDSCH further includes an HARQ-ACK bit number indication information field, wherein the HARQ-ACK bit number indication information field is used to indicate the number of bits of the HARQ-ACK.

Wherein the number of bits indicating the HARQ-ACK may be the number of bits of HARQ-ACK generated by one PDSCH; or the number of bits indicating the HARQ-ACK is the number of bits of HARQ-ACK determined according to a set of downlink time slots in which the HARQ-ACK is fed back in any of uplink subframes.

In an embodiment of the present disclosure, an electronic device, comprises: a processor and a memory, the memory stores at least one instruction, at least one program, a code set or an instruction set, the at least one instruction, the at least one program, the code set or the instruction set being loaded and executed by the processor to implement the method thereof.

In an embodiment of the present disclosure, a computer readable storage medium, the computer storage medium is for storing computer instructions, programs, a code set or a set of instructions which, when operated on a computer, cause the computer to perform the method thereof.

In an embodiment of the present disclosure, a method for reporting channel state information, comprises: receiving information of a base station; determining the number of resources for a physical downlink shared channel (PDSCH) transmission required for determining channel state information (CSI) according to the received information, or determining the number of resources for the PDSCH transmission based on a subcarrier spacing of a current orthogonal frequency division multiplexing (OFDM) symbol; and determining the CSI based on the number of the resources for the PDSCH transmission, and transmitting the determined CSI to the base station.

Wherein the CSI configuration relationship may be a mapping relationship between a signal-to-noise ratio and a CSI, and the determining the CSI corresponding to the number of the resources for the PDSCH transmission based on the CSI configuration relationship corresponding to the number of the resources for the PDSCH transmission comprises: determining the current signal-to-noise ratio; and determining a CSI corresponding to the current signal-to-noise ratio based on the current signal-to-noise ratio and the mapping relationship between the signal-to-noise ratio and the CSI corresponding to the number of the resources for the PDSCH transmission, wherein the CSI corresponding to the current signal-to-noise ratio is the CSI corresponding to the number of the resources for the PDSCH transmission.

Wherein the determining the CSI configuration relationship corresponding to the number of the resources for the PDSCH transmission may comprise: determining the CSI configuration relationship corresponding to the number of the resources for the PDSCH transmission based on the subcarrier spacing of the current OFDM symbol, wherein the CSI configuration relationships corresponding to the at least two subcarrier spacings are different.

Wherein for a aperiodic CSI report or a semi-persistent CSI report, the physical layer signaling may be a physical layer signaling for indicating a CSI report.

Wherein the information bit in the physical layer signaling may be an information bit for indicating the CSI report in the physical layer signaling or an information bit specified in the physical layer signaling.

In an embodiment of the present disclosure, a method for reporting channel state information, comprises: transmitting information to a terminal equipment and receiving channel state information (CSI) transmitted by the terminal equipment, wherein the CSI is determined by the terminal equipment based on the number of resources for PDSCH transmission that is determined based on the information; or, receiving the CSI transmitted by the terminal equipment, wherein the CSI is determined based on the number of the resources for the PDSCH transmission that is determined based on a subcarrier spacing of a current orthogonal frequency division multiplexing (OFDM) symbol.

Wherein the information may be at least one of a high layer signaling and a physical layer signaling.

In an embodiment of the present disclosure, a base station, comprises: a channel state information (CSI) receiving module configured to transmit information to a terminal equipment and receive a CSI transmitted by the terminal equipment, wherein the CSI is determined by the terminal equipment based on the number of resources for a physical downlink shared channel (PDSCH) transmission that is determined based on the information; or, receive the CSI transmitted by the terminal equipment, wherein the CSI is determined based on the number of the resources for the PDSCH transmission that is determined based on a subcarrier spacing of a current orthogonal frequency division multiplexing (OFDM) symbol.

In an embodiment of the present disclosure, an electronic equipment, comprises: a memory configured to store computer instructions; and a processor configured to execute the computer instructions to perform the method thereof.

In an embodiment of the present disclosure, a computer-readable storage medium, wherein the storage medium stores a computer program that, when executed by a processor, implements the method thereof.

It should be understood that although the various steps in the flowchart of the drawings are sequentially displayed as indicated by the arrows, these steps are not necessarily performed in the order indicated by the arrows. Except as explicitly stated herein, the execution of these steps is not strictly limited, and may be performed in other sequences. Moreover, at least some of the steps in the flowchart of the drawings may include multiple sub-steps or multiple stages, which are not necessarily performed at the same time, but may be executed at different times, and the execution order thereof is also not necessarily performed sequentially, but may be performed alternately or alternately with other steps or sub-steps of other steps or at least a portion of the stages.

The above description is only a partial embodiment of the present application, and it should be noted that those skilled in the art can also make some improvements and retouching without departing from the principle of the present application. The improvements and retouching should be considered as the scope of protection of the present application.

INDUSTRIAL APPLICABILITY

Various embodiments of the present application can be used for wireless communication.

The invention claimed is:
1. A method for transmitting hybrid automatic retransmission request acknowledgement (HARQ-ACK) information performed by a terminal in a wireless communication system, the method comprising:
obtaining information on a length of a time unit (TU) for a physical uplink control channel (PUCCH), the TU being a part of a time slot;
receiving, from a base station, downlink control information (DCI) on a physical downlink control channel (PDCCH), the DCI including a HARQ feedback timing indication;
receiving, from the base station, data on a physical downlink shared channel (PDSCH) based on the DCI;
determining a first TU overlapping with a last orthogonal frequency division multiplexing (OFDM) symbol in a time slot in which the PDSCH is received;

determining a second TU based on the first TU, the HARQ feedback timing indication, and the length of the TU; and transmitting the HARQ-ACK information for the received data on the PUCCH in the second TU.

2. The method of claim 1, wherein more than one PUCCHs are used for transmitting the HARQ-ACK information in a time slot.

3. The method of claim 1, wherein the first TU is determined as a reference point where the HARQ feedback timing indication is equal to 0.

4. The method of claim 1, wherein the HARQ feedback timing indication uses the part of the time slot, TU, as a unit of the HARQ feedback timing indication.

5. A terminal for transmitting hybrid automatic retransmission request acknowledgement (HARQ-ACK) information in a wireless communication system, the terminal comprising:
a transceiver; and
a processor configured to:
obtain information on a length of a time unit (TU) for a physical uplink control channel (PUCCH) the TU being a part of a time slot;
receive, from a base station, downlink control information (DCI) on a physical downlink control channel (PDCCH) the DCI including a HARQ feedback timing indication;
receive, from the base station, data on a physical downlink shared channel (PDSCH) based on the DCI;
determine a first TU overlapping with a last orthogonal frequency division multiplexing (OFDM) symbol in a time slot in which the PDSCH is received;
determine a second TU based on the first TU, the HARQ feedback timing indication, and the length of the TU; and
transmit the HARQ-ACK information for the received data on the PUCCH in the second TU.

6. The terminal of claim 5, wherein more than one PUCCHs are used for transmitting the HARQ-ACK information in a time slot.

7. The terminal of claim 5, the first TU is determined as a reference point where the HARQ feedback timing indication is equal to 0.

8. The terminal of claim 5, wherein the HARQ feedback timing indication uses the part of the time slot, TU, as a unit of the HARQ feedback timing indication.

9. A method for transmitting hybrid automatic retransmission request acknowledgement (HARQ-ACK) information performed by a base station in a wireless communication system, the method comprising:
transmitting information on a length of a time unit (TU) for a physical uplink control channel (PUCCH), the TU being a part of a time slot;
transmitting, to a terminal, downlink control information (DCI) on a physical downlink control channel (PDCCH), the DCI including a HARQ feedback timing indication;
transmitting, to the terminal, data on a physical downlink shared channel (PDSCH) based on the DCI; and
receiving, the HARQ-ACK information for the transmitted data on the PUCCH in a second TU,
wherein a first TU is a TU overlapping with a last orthogonal frequency division multiplexing (OFDM) symbol in a time slot in which the PDSCH is transmitted, and
wherein the second TU is based on the first TU, the HARQ feedback timing indication, and the length of the TU.

10. The method of claim 9, wherein more than one PUCCHs are used for transmitting the HARQ-ACK information in a time slot.

11. The method of claim 9, wherein the first TU is determined as a reference point where the HARQ feedback timing indication is equal to 0.

12. The method of claim 9, wherein the HARQ feedback timing indication uses the part of the time slot, TU, as a unit of the HARQ feedback timing indication.

13. A base station for transmitting hybrid automatic retransmission request acknowledgement (HARQ-ACK) information in a wireless communication system, the base station comprising:
a transceiver; and
a processor configured to:
transmit information on a length of a time unit (TU) for a physical uplink control channel (PUCCH), the TU being a part of a time slot;
transmit, to a terminal, downlink control information (DCI) on a physical downlink control channel (PDCCH), the DCI including a HARQ feedback timing indication;
transmit, to the terminal, data on a physical downlink shared channel (PDSCH) based on the DCI; and
receive, the HARQ-ACK information for the transmitted data on the PUCCH in a second TU,
wherein a first TU is a TU overlapping with a last orthogonal frequency division multiplexing (OFDM) symbol in a time slot in which the PDSCH is transmitted, and
wherein the second TU is based on the first TU, the HARQ feedback timing indication, and the length of the TU.

14. The base station of claim 13, wherein more than one PUCCHs are used for transmitting the HARQ-ACK information in a time slot.

15. The base station of claim 13, wherein the first TU is determined as a reference point where the HARQ feedback timing indication is equal to 0, and
wherein the HARQ feedback timing indication uses the part of the time slot, TU, as a unit of the HARQ feedback timing indication.

* * * * *